US012404746B2

(12) United States Patent
Lorenson et al.

(10) Patent No.: US 12,404,746 B2
(45) Date of Patent: Sep. 2, 2025

(54) FLOW-THROUGH PULSING ASSEMBLY FOR USE IN DOWNHOLE OPERATIONS

(71) Applicant: IMPULSE DOWNHOLE SOLUTIONS LTD., Edmonton (CA)

(72) Inventors: Troy Lorenson, Edmonton (CA); Kevin Leroux, Beaumont (CA); Dwayne Parenteau, Edmonton (CA); Douglas Kinsella, Sturgeon County (CA)

(73) Assignee: IMPULSE DOWNHOLE SOLUTIONS LTD., Edmonton (CA)

(*) Notice: Subject to any disclaimer, the term of this patent is extended or adjusted under 35 U.S.C. 154(b) by 0 days.

(21) Appl. No.: 18/460,520

(22) Filed: Sep. 1, 2023

(65) Prior Publication Data

US 2023/0417126 A1 Dec. 28, 2023

Related U.S. Application Data

(63) Continuation of application No. 17/197,896, filed on Mar. 10, 2021, now Pat. No. 11,788,382, which is a (Continued)

(51) Int. Cl.
*E21B 7/24* (2006.01)
*E21B 4/02* (2006.01)
(Continued)

(52) U.S. Cl.
CPC .............. *E21B 34/142* (2020.05); *E21B 4/02* (2013.01); *E21B 34/06* (2013.01); *F03C 2/08* (2013.01);
(Continued)

(58) Field of Classification Search
CPC ...... E21B 47/185; E21B 28/00; E21B 43/003; E21B 4/02; E21B 7/24; F16K 3/085
See application file for complete search history.

(56) References Cited

U.S. PATENT DOCUMENTS

| | | | |
|---|---|---|---|
| 860,684 | A | 7/1907 | Montgomery |
| 1,132,063 | A | 3/1915 | Bardeen |

(Continued)

FOREIGN PATENT DOCUMENTS

| | | | |
|---|---|---|---|
| CA | 2175296 | A1 | 10/1997 |
| CA | 2196857 | A1 | 8/1998 |

(Continued)

OTHER PUBLICATIONS

Drill on Target Directional Services Inc., "Drill on Target: Advanced Drilling Solutions", published at least as early as Aug. 20, 2015 (5 pages).

(Continued)

*Primary Examiner* — Kipp C Wallace
(74) *Attorney, Agent, or Firm* — Jenna L. Wilson; Wilson Lue LLP (firm)

(57) ABSTRACT

A flow-through assembly for use in a downhole drilling string includes a Moineau-type motor, means for selectively activating the motor such as a ball catch component that selectively causes drilling fluid to enter into or bypass the motor, and a rotating variable choke assembly that is driven by a rotor of the motor. The choke assembly varies the flow rate of drilling fluid as rotation causes ports of the choke assembly to enter into and out of alignment with each other. In one embodiment, the choke assembly comprises a faceted rotary component including bypass ports on the facets of the component. In another embodiment, the choke assembly comprises a tapered rotary component that rotates in a complementarily tapered stationary component.

17 Claims, 11 Drawing Sheets

Related U.S. Application Data continuation of application No. 16/241,029, filed on Jan. 7, 2019, now Pat. No. 10,968,721, which is a continuation of application No. PCT/CA2017/050828, filed on Jul. 7, 2017.

(60) Provisional application No. 62/359,683, filed on Jul. 7, 2016.

(51) Int. Cl.

| | |
|---|---|
| ***E21B 34/06*** | (2006.01) |
| ***E21B 34/14*** | (2006.01) |
| ***F03C 2/08*** | (2006.01) |
| ***F04C 2/107*** | (2006.01) |
| ***F04C 13/00*** | (2006.01) |
| ***F04C 14/24*** | (2006.01) |

(52) U.S. Cl.
CPC ............ *F04C 2/107* (2013.01); *F04C 13/008* (2013.01); *F04C 14/24* (2013.01)

(56) References Cited

U.S. PATENT DOCUMENTS 2,250,912 A 7/1941 Hudson
2,329,912 A 9/1943 Kent
2,481,059 A 9/1949 Africano
2,569,026 A 9/1951 Springer
2,738,956 A 3/1956 Bielstein
2,743,083 A 4/1956 Zublin
2,746,721 A 5/1956 Moore
2,780,438 A 2/1957 Bielstein
2,836,395 A 5/1958 Bielstein
2,896,916 A 7/1959 Clavier
2,942,851 A 6/1960 Beck
3,065,416 A 11/1962 Jeter
3,096,833 A 7/1963 Bodine
3,101,796 A 8/1963 Stall et al.
3,216,514 A 11/1965 Nelson
3,243,001 A 3/1966 Vincent
3,252,689 A 5/1966 Blomgren
3,270,822 A 9/1966 Cleary
3,292,898 A 12/1966 Willman
3,547,006 A 12/1970 Rudman
3,557,875 A 1/1971 Solum et al.
3,640,351 A 2/1972 Coyne
3,739,331 A 6/1973 Godbey et al.
3,768,576 A 10/1973 Martini
3,894,818 A 7/1975 Tschirky
3,899,033 A 8/1975 Van Huisen
3,933,209 A 1/1976 Sweeney
3,941,196 A 3/1976 Curington
4,033,429 A 7/1977 Farr
4,058,163 A 11/1977 Yandell
4,080,115 A 3/1978 Sims
4,187,061 A * 2/1980 Jurgens ............... F04C 15/0042 418/153
4,291,723 A 9/1981 Beimgraben
4,296,822 A 10/1981 Ormsby
4,360,040 A 11/1982 Cove
4,384,625 A 5/1983 Roper
4,499,956 A 2/1985 Campbell
4,574,894 A * 3/1986 Jadwin .................. E21B 34/142 137/71
4,705,117 A 11/1987 Warren
4,789,032 A 12/1988 Rehm
4,817,739 A 4/1989 Jeter
4,819,745 A 4/1989 Walter
4,830,122 A 5/1989 Walter
4,890,682 A 1/1990 Worrall
4,936,397 A 6/1990 McDonald et al.
4,953,595 A 9/1990 Kotlyar
4,979,577 A 12/1990 Walter
5,009,272 A 4/1991 Walter
5,048,622 A 9/1991 Ide
5,139,400 A 8/1992 Ide
5,176,164 A 1/1993 Boyle
5,186,614 A 2/1993 Abousabha
5,190,114 A 3/1993 Walter
5,404,945 A * 4/1995 Head ....................... E21B 21/10 138/42
5,513,713 A 5/1996 Groves
5,535,835 A 7/1996 Walker
5,662,180 A 9/1997 Coffman
5,673,751 A 10/1997 Head
5,692,563 A 12/1997 Krueger
6,199,586 B1 3/2001 Pawelzik
6,279,670 B1 8/2001 Eddison
6,289,911 B1 9/2001 Majkovic
6,431,294 B1 8/2002 Eddison
6,439,318 B1 8/2002 Eddison
6,469,637 B1 10/2002 Seyler et al.
6,508,317 B2 1/2003 Eddison
6,571,870 B2 6/2003 Zheng
6,866,104 B2 3/2005 Stoesz
6,994,175 B2 2/2006 Egerstrom
7,073,610 B2 7/2006 Susman
7,139,219 B2 11/2006 Kolle
7,163,058 B2 1/2007 Bakke
7,219,752 B2 5/2007 Wassell
7,424,922 B2 9/2008 Hall
7,549,485 B2 6/2009 Radford et al.
7,575,051 B2 8/2009 Stoesz et al.
7,708,088 B2 5/2010 Allahar et al.
7,921,937 B2 4/2011 Brackin
8,162,078 B2 4/2012 Anderson
8,167,051 B2 5/2012 Eddison
8,181,719 B2 5/2012 Bunney
8,201,641 B2 6/2012 Allahar
8,322,463 B2 12/2012 Walter
8,535,028 B2 9/2013 Groves
8,636,073 B2 1/2014 McNeilly
8,869,916 B2 10/2014 Clausen et al.
9,004,194 B2 4/2015 Eddison
9,091,123 B2 7/2015 Gust
9,181,767 B2 11/2015 Schultz
9,212,522 B2 12/2015 Schultz
9,267,539 B2 2/2016 Gynz-Rekowski
9,273,529 B2 3/2016 Eddison et al.
9,359,866 B2 6/2016 Mackenzie
9,371,692 B2 6/2016 Eddison
9,382,760 B2 7/2016 Le
9,382,950 B2 7/2016 Pheasey
9,476,263 B2 10/2016 Clausen et al.
9,494,006 B2 11/2016 Mohon et al.
9,523,251 B2 12/2016 Honekamp
9,540,877 B2 1/2017 Lanning et al.
9,593,537 B2 3/2017 Gust
9,593,547 B2 3/2017 Malcolm
9,598,923 B2 3/2017 Gilleylen et al.
9,624,767 B2 4/2017 Sitka
9,637,976 B2 5/2017 Lorenson
9,732,573 B2 8/2017 Adam
9,752,411 B2 9/2017 Adam
9,765,584 B2 9/2017 Lorenson et al.
9,840,873 B2 12/2017 Schultz
9,879,495 B2 1/2018 Baudoin
9,932,774 B2 4/2018 Gillis
9,957,765 B2 5/2018 Schultz
10,316,588 B1 6/2019 Robertson et al.
10,358,872 B2 7/2019 Rossing et al.
10,590,709 B2 3/2020 Sicilian
10,633,920 B2 4/2020 Lorenson et al.
10,648,265 B2 5/2020 Kinsella et al.
10,724,318 B2 7/2020 Schultz
10,927,601 B2 2/2021 Lorenson
10,989,004 B2 4/2021 Russell et al.
11,268,337 B2 3/2022 Kinsella et al.
2002/0157871 A1 10/2002 Tulloch
2004/0045716 A1 3/2004 Bakke
2005/0126828 A1 6/2005 Pinol
2005/0211471 A1 9/2005 Zupanick
2006/0108152 A1 5/2006 Lee
2006/0237187 A1 10/2006 Stoesz et al.

(56) References Cited

U.S. PATENT DOCUMENTS

| | | | |
|---|---|---|---|
| 2006/0243493 | A1 | 11/2006 | El-Rayes |
| 2006/0272821 | A1 | 12/2006 | Webb |
| 2007/0221409 | A1 | 9/2007 | Hall |
| 2007/0221412 | A1 | 9/2007 | Hall |
| 2008/0000697 | A1 | 1/2008 | Rytlewski |
| 2008/0029268 | A1 | 2/2008 | Macfarlane |
| 2008/0135295 | A1 | 6/2008 | Hall |
| 2008/0271923 | A1 | 11/2008 | Kusko |
| 2009/0095528 | A1 | 4/2009 | Hay |
| 2009/0101328 | A1 | 4/2009 | Leslie et al. |
| 2009/0107723 | A1 | 4/2009 | Kusko |
| 2009/0183919 | A1 | 7/2009 | Hall |
| 2009/0266612 | A1 | 10/2009 | Allahar et al. |
| 2010/0018201 | A1 | 1/2010 | Mochizuki |
| 2010/0065334 | A1 | 3/2010 | Hall |
| 2010/0212900 | A1 | 8/2010 | Eddison |
| 2010/0212901 | A1 | 8/2010 | Buytaert |
| 2010/0224412 | A1 | 9/2010 | Allahar |
| 2010/0247359 | A1 | 9/2010 | Hauri |
| 2010/0276198 | A1 | 11/2010 | Light |
| 2010/0326733 | A1 | 12/2010 | Anderson |
| 2011/0000716 | A1 | 1/2011 | Comeau |
| 2011/0073374 | A1 | 3/2011 | Bunney et al. |
| 2011/0240315 | A1 | 10/2011 | McNeilly |
| 2012/0048619 | A1 | 3/2012 | Seutter |
| 2012/0193145 | A1 | 8/2012 | Anderson |
| 2012/0279724 | A1 | 11/2012 | Eddison et al. |
| 2013/0048386 | A1 | 2/2013 | Le et al. |
| 2013/0118812 | A1 | 5/2013 | Clausen et al. |
| 2013/0168099 | A1 | 7/2013 | Themig |
| 2013/0251512 | A1 | 9/2013 | Lombard |
| 2013/0277116 | A1 | 10/2013 | Knull |
| 2014/0041943 | A1 | 2/2014 | Lanning |
| 2014/0048283 | A1 | 2/2014 | Mohon et al. |
| 2014/0060830 | A1 | 3/2014 | Love |
| 2014/0069639 | A1 | 3/2014 | Mackenzie et al. |
| 2014/0151068 | A1 | 6/2014 | Gilleylen et al. |
| 2014/0190749 | A1 | 7/2014 | Lorenson et al. |
| 2014/0199196 | A1 | 7/2014 | Twardowski |
| 2014/0216761 | A1 | 8/2014 | Trinh |
| 2014/0246241 | A1 | 9/2014 | Phillips |
| 2014/0262216 | A1 | 9/2014 | Perry |
| 2015/0008043 | A1 | 1/2015 | Clausen et al. |
| 2015/0027708 | A1 | 1/2015 | Honekamp |
| 2015/0041217 | A1 | 2/2015 | Gust |
| 2015/0075867 | A1 | 3/2015 | Eddison et al. |
| 2015/0136403 | A1 | 5/2015 | Cheng et al. |
| 2015/0159437 | A1 | 6/2015 | Crowley et al. |
| 2015/0315902 | A1 | 11/2015 | Beach et al. |
| 2015/0354307 | A1 | 12/2015 | Baudoin |
| 2016/0032653 | A1 | 2/2016 | James et al. |
| 2016/0108677 | A1 | 4/2016 | von Gynz-Rekowski et al. |
| 2016/0281449 | A1 | 9/2016 | Lorenson |
| 2017/0159387 | A1 | 6/2017 | Johnson |
| 2017/0204693 | A1 | 7/2017 | von Gynz-Rekowski et al. |
| 2017/0254179 | A1 | 9/2017 | Horwell |
| 2018/0058145 | A1 | 3/2018 | Tutt |
| 2018/0156001 | A1 | 6/2018 | Schwendemann et al. |
| 2018/0163495 | A1 | 6/2018 | Kinsella et al. |
| 2018/0163496 | A1 | 6/2018 | Oag et al. |
| 2018/0171719 | A1 | 6/2018 | Donald et al. |
| 2018/0230750 | A1 | 8/2018 | Lorenson |
| 2018/0236580 | A1 | 8/2018 | Kolbe |
| 2018/0291733 | A1 | 10/2018 | Ritchie et al. |
| 2019/0010762 | A1 | 1/2019 | Rossing et al. |
| 2019/0257167 | A1 | 8/2019 | Kinsella et al. |
| 2020/0024924 | A1 | 1/2020 | Clausen et al. |
| 2020/0123856 | A1 | 4/2020 | Sicilian et al. |
| 2020/0141187 | A1 | 5/2020 | Lorenson |
| 2020/0240227 | A1 | 7/2020 | Kinsella et al. |
| 2022/0145714 | A1 | 5/2022 | Kinsella et al. |

FOREIGN PATENT DOCUMENTS

| | | | |
|---|---|---|---|
| CA | 2316796 | A1 | 10/1998 |
| CA | 2320280 | A1 | 8/1999 |
| CA | 2421211 | A1 | 3/2002 |
| CA | 2497458 | A1 | 3/2004 |
| CA | 2255065 | C | 1/2007 |
| CA | 2312341 | C | 8/2007 |
| CA | 2658162 | A1 | 1/2008 |
| CA | 2671171 | A1 | 1/2011 |
| CA | 2680895 | A1 | 3/2011 |
| CA | 2487380 | C | 2/2013 |
| CA | 2890072 | A1 | 5/2014 |
| CA | 2798807 | A1 | 6/2014 |
| CA | 2836182 | A1 | 6/2014 |
| CA | 2892971 | A1 | 6/2014 |
| CA | 2922999 | A1 | 5/2015 |
| CA | 2933482 | A1 | 7/2015 |
| CA | 2872736 | C | 12/2015 |
| CA | 2951397 | A1 | 12/2015 |
| CA | 2960699 | A1 | 3/2016 |
| CA | 2994473 | A1 | 2/2017 |
| CN | 105735929 | A | 7/2016 |
| EP | 0335543 | A1 | 10/1989 |
| EP | 3334891 | A0 | 2/2017 |
| GB | 713052 | A | 8/1954 |
| GB | 2059481 | A | 4/1981 |
| GB | 2398086 | A | 8/2004 |
| GB | 2529481 | A | 2/2016 |
| WO | 94/016189 | A1 | 7/1994 |
| WO | 2011058307 | A2 | 5/2011 |
| WO | 2012116393 | A1 | 9/2012 |
| WO | 2012/138383 | A2 | 10/2012 |
| WO | 2013106938 | A1 | 7/2013 |
| WO | 2014081417 | A1 | 5/2014 |
| WO | 2014089618 | A1 | 6/2014 |
| WO | 2015081432 | A1 | 6/2015 |
| WO | 2016024968 | A1 | 2/2016 |
| WO | 2016027103 | A1 | 2/2016 |
| WO | 2017027960 | A1 | 2/2017 |
| WO | 2018/006178 | A1 | 1/2018 |

OTHER PUBLICATIONS

Wedel, Ryan et al., "Mitigating Bit-Related Stick-Slip With a Torsional Impact Hammer", 2011 AADE National Technical Conference and Exhibition held at the Hilton Houston North Hotel, Houston, Texas, Apr. 12-14, 2011, pp. 1-5.

Powell, Scott et al., "Fluid Hammer Increases PDC Performance through Axial and Torsional Energy at the Bit", SPE 166433, SPE Annual Technical Conference and Exhibition, New Orleans, Louisiana, USA, 30 Sep.-Oct. 2, 2013, pp. 1-7.

National Oilwell Varco, "6 3/4" FluidHammer—Operating Specifications", published at least as early as Nov. 2015, p. 1.

NOV Wellbore Technologies, "Agitator(TM) Systems", published at least as early as Feb. 2016, pp. 1-5.

International Search Report and Written Opinion dated Oct. 12, 2017 from PCT/CA2017/050828, pp. 1-11.

Office Action dated Apr. 23, 2015 from CA 2,872,736, pp. 1-3.

International Search Report and Written Opinion dated Feb. 23, 2015 from PCT/CA2014/051155, pp. 1-7.

International Preliminary Report on Patentability dated Jan. 17, 2019 from PCT/CA2017/050828, pp. 1-8.

Extended European Search Report dated Jan. 30, 2020 from EP 17823382.1, pp. 1-7.

International Search Report and Written Opinion dated Oct. 13, 2016 from PCT/CA2016/050950, pp. 1-7.

International Preliminary Report on Patentability dated Mar. 1, 2018 from PCT/CA2016/050950, pp. 1-5.

International Search Report and Written Opinion dated Oct. 28, 2016 from PCT/CA2016/051096, pp. 1-8.

International Preliminary Report on Patentability dated Mar. 29, 2018 from PCT/CA2016/051096, pp. 1-6.

Office Action dated Apr. 4, 2019 from U.S. Appl. No. 15/751,667, pp. 1-11.

(56) References Cited

OTHER PUBLICATIONS

Notice of Allowance dated Feb. 5, 2020 from U.S. Appl. No. 15/757,914, pp. 1-59.
Office Action dated Mar. 25, 2020 from U.S. Appl. No. 16/736,500, pp. 1-10.
International Preliminary Report on Patentability dated Jun. 16, 2016 from PCT/CA2014/051155, pp. 1-5.
Office Action dated Oct. 4, 2016 from U.S. Appl. No. 14/771,418, pp. 1-19.
International Search Report and Written Opinion dated Sep. 9, 2016 from from PCT/CA2016/050794, pp. 1-10.
International Preliminary Report on Patentability dated Mar. 1, 2018 from PCT/CA2016/050794, pp. 1-8.
Extended European Search Report dated May 16, 2019 from EP 16836307.5, pp. 1-11.
Examiner's Report dated May 6, 2020 from EP 16836307.5, pp. 1-6.
Office Action dated May 10, 2018 from U.S. Appl. No. 15/892,866, pp. 1-23.
Office Action dated Jul. 15, 2019 from U.S. Appl. No. 16/382,610, pp. 1-39.
Office Action dated Aug. 17, 2018 from CA 2,798,807, pp. 1-5.
Office Action dated May 30, 2019 from CA 2,798,807, pp. 1-4.
Office Action dated Jun. 3, 2019 from CA 2,836,182, pp. 1-4.
Office Action dated Mar. 22, 2016 from U.S. Appl. No. 14/153,646, pp. 1-22.
Notice of Allowance dated Dec. 21, 2016 from U.S. Appl. No. 14/153,646, pp. 1-16.
Examination Report dated Mar. 18, 2021 from Australian Patent Application No. 2016308770, pp. 1-5.
Examination Report dated Jun. 28, 2021 from U.S. Appl. No. 16/849,055, pp. 1-23.
Examination Report dated Mar. 29, 2022 from AU2017292912, pp. 1-4.
Examination Report dated Sep. 27, 2022 from U.S. Appl. No. 17/586,087, pp. 1-20.
Examination Report dated Nov. 23, 2022 from CA2994474, pp. 1-3.
Notice of Allowance dated Mar. 7, 2023 from CA2994473, 1 pg.
Challenger Downhole Tools Inc., "Challenger Sidewinder", retrieved from https://web.archive.org/web/20150814052022/http://challengerdownhole.com/downhole-tool-products/challenger-sidewinder/, Aug. 14, 2015, 1 pg.
Challenger Downhole Tools Inc., "Challenger Sidewinder", retrieved from https://web.archive.org/web/20160109112740/http://challengerdownhole.com:80/downhole-tool-products/challenger-sidewinder/, Jan. 9, 2016, 2 pgs.
Cougar Drilling Solutions, "MT Mechanical Thruster Technical Specs", 1 pg (2020). Retrieved Feb. 27, 2025 from https://www.amasenergy.com/sites/default/files/attach/2020-08/cougar_ds_-_mt_mechanical_thruster_-_technical_specifications_1598863182_1598863223.pdf.
Energy Dais, "Mechanical Thruster(TM) by Cougar Drilling Solutions", 5 pgs. Retrieved Feb. 27, 202 from https://www.energydais.com/cougar-drilling-solutions/mechanical-thruster-tm-7753/. Best available copy.
NOV Wellbore Technologies, "Agitator(TM) Systems", published at least as early as Feb. 2016, 5 pgs.
Rasheed, W. "Extending the Reach and Capability of Non Rotating BHAs by Reducing Axial Friction." Paper presented at the SPE/ICoTA Coiled Tubing Roundtable, Houston, Texas, Mar. 2001. doi: https://doi.org/10.2118/68505-MS. 9 pgs.
Weatherford International, "Renegade Friction-Reduction Tool", 2 pgs (2013). Retrieved Feb. 27, 2025 from https://www.weatherford.com/documents/technical-specification-sheet/products-and-services/completions/renegade-friction-reduction-tool/.
Office Action dated Jul. 3, 2023 in Australian Patent Application No. 2022201161, pp. 1-5.
Office Action dated Feb. 7, 2019 in Canadian Patent Application No. 2994473, pp. 1-4.
Office Action dated Mar. 18, 2021 in Australian Patent Application No. 2016308770, pp. 1-5.
Office Action dated Oct. 12, 2018 from U.S. Appl. No. 15/892,866, pp. 1-11.
Office Action dated Oct. 3, 2023 in Canadian Patent Application No. 3029872, pp. 1-4.
Office Action dated Mar. 29, 2022 in Australian Patent Application No. 2017292912, pp. 1-4.
Office Action dated Mar. 23, 2023 in Australian Patent Application No. 2017292912, pp. 1-4.
Office Action dated Mar. 31, 2023 in U.S. Appl. No. 17/586,097, pp. 1-17.
Office Action dated Apr. 18, 2024 in U.S. Appl. No. 18/486,833, pp. 1-14.
Office Action dated Oct. 28, 2024 in U.S. Appl. No. 18/486,833, pp. 1-11.

* cited by examiner

FLOW-THROUGH PULSING ASSEMBLY FOR USE IN DOWNHOLE OPERATIONS

CROSS-REFERENCE TO RELATED APPLICATIONS

This application is a continuation of U.S. patent application Ser. No. 17/197,896, filed Mar. 10, 2021, which is a continuation of U.S. patent application Ser. No. 16/241,029, filed Jan. 7, 2019, which is a continuation of International Application No. PCT/CA2017/050828, filed Jul. 7, 2017, which claims priority to U.S. Provisional Application No. 62/359,683, filed Jul. 7, 2016, the entireties of which are incorporated herein by reference.

TECHNICAL FIELD

The present disclosure relates to downhole drilling assemblies for use in horizontal and vertical drilling operations, and in particular valve control within a drilling string.

TECHNICAL BACKGROUND

In oil and gas production and exploration, downhole drilling can be accomplished with a downhole drill powered by a mud motor. The drilling fluid used to drive the motor also assists the drilling process in other ways, for example by dislodging and removing drill cuttings, cooling the drill bit, and providing pressure to prevent formation fluids from entering the wellbore.

Stalling and slip-stick issues can result in damage to drilling string components. It is believed that applying a vibrational or oscillating effect to the drill string components can improve performance of a downhole drill, and/or mitigate or reduce incidences of stalling and slip-stick.

Further, when drilling deep bore holes in the earth, sections of the bore hole can cause drag or excess friction which may hinder proper weight transfer to the drill bit or causes erratic torque in the drill string. These effects may have the result of slowing down the rate of penetration, creating bore hole deviation issues, or even damaging drill string components.

Friction tools are often used to overcome these problems by vibrating a portion of the drill string to reduce friction or hole drag. Friction tools may form part of the downhole assembly of the drilling string, and can be driven by the flow of drilling fluid through the friction tool. Accordingly, the operation of a friction tool may be constrained by the flow rate of drilling fluid pumped through the string. Controlling the frequency of operation of the friction tool may therefore require varying or stopping the flow rate of the drilling fluid at the surface.

It is not always desirable to run a friction tool during the entirety of a drilling operation. For instance, it may be unnecessary or undesirable to run the tool while the drill bit is at a shallow depth, or at other stages of the drilling operation where the added vibration of the friction tool is problematic or not required. During those stages, the drill string may be assembled without the friction tool. However, when a location in the bore hole is reached where the need for a friction tool is evident, it may then necessary to pull the downhole assembly to the surface to reassemble the drilling string to include the friction tool, then return the drilling string to the drill point. This process can consume several work hours.

BRIEF DESCRIPTION OF THE DRAWINGS

In drawings which illustrate by way of example only embodiments of the present disclosure, in which like reference numerals describe similar items throughout the various figures.

DETAILED DESCRIPTION OF THE INVENTION

Figure 1:
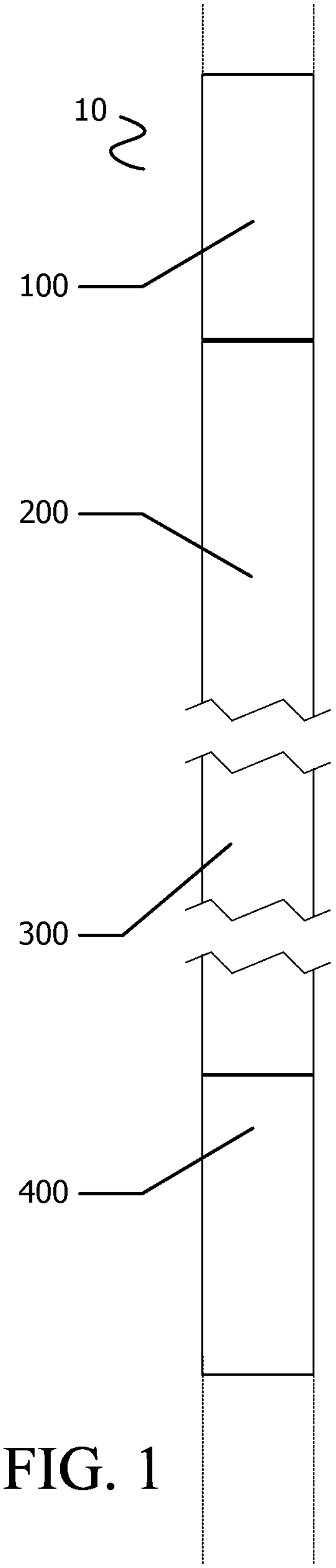
FIG. 1 depicts a portion of a drilling string including a flow-through pulsing assembly.

As is generally understood by those skilled in the art, in prior art downhole assemblies employing a power section (motor), drilling fluid passes from a bore or passage above the motor and into the motor to thereby activate the motor. This may be achieved by causing a rotor to rotate, and consequently drive any downhole tools linked to the rotor, such as a friction tool. Fluid passing through the motor enters the bore or passage downstream of the rotor. As can be seen in the particular example assembly 10 illustrated in FIGS. 1 and 2 and as discussed in further detail below, the drilling fluid passes from the motor section 200 to the drive section 300 and on to the valve section 400; the rotor 210 is mechanically linked to the valve assembly in the valve section 400 to thereby drive a rotating component of the valve assembly.

The rotation speed and horsepower of the motor is determined in part by the flow rate of drilling fluid through the motor. In a Moineau motor ("mud motor"), the particular lobe configuration of the motor and the drilling fluid type and properties will affect the motor output as well. In practice, once a drilling string is assembled and in place in the wellbore, the rotation speed and power of a motor such as a Moineau power section are changeable only by varying the flow rate of drilling fluid or else by retracting the drilling string from the bore hole, disassembling it, and reassembling it with a differently configured motor. However, it may not be desirable to vary the flow rate of the drilling fluid in this manner, and disassembling and reassembling a drilling string can consume several hours of labour.

Accordingly, a flow-through assembly 10 with a selectively activatable motor and rotating variable choke assembly is provided for use in a downhole drilling string. The flow-through assembly 10 provides a system that can be inserted into the bore hole and then selectively activated or deactivated to control the flow of drilling fluid through the motor assembly, and from the motor to any tools or other features controlled or activated by the motor assembly. When the assembly 10 includes the rotating variable choke assembly, the variable choke assembly can be selectively activated or deactivated to provide a pulsing fluid flow for use in operating friction reduction tools or other types of tools. In these embodiments, activation of the motor can include starting the motor from a stopped or stalled state (i.e., no rotation of the rotor), to an "on" state in which the rotor rotates, or from a lower output state (i.e., a lower rate of rotation or lower torque output), to an increased or higher output state (i.e., a higher rate of rotation or higher torque output).

Figure 2:
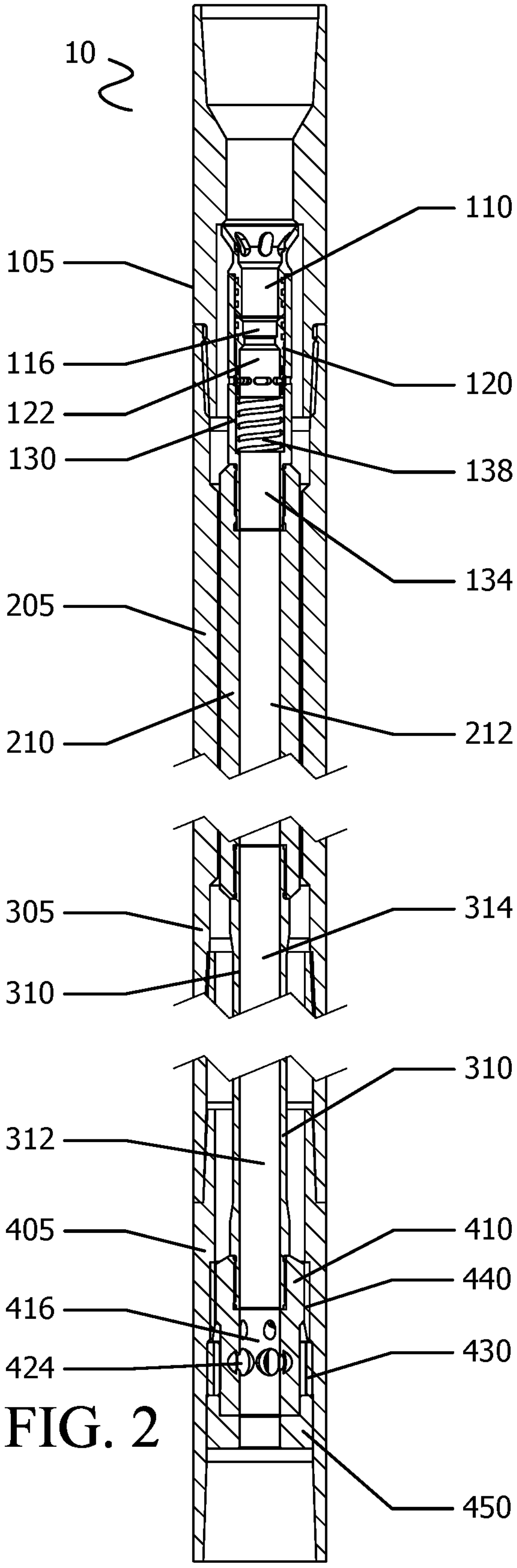
FIG. 2 is a lateral cross-sectional view of the flow-through pulsing assembly of FIG. 1.

The structure of the flow-through assembly 10 is generally illustrated in FIGS. 1 and 2, which provide lateral views of one example of the assembly 10 with FIG. 1 being a view of the flow-through assembly 10 in relative position within a drilling string (indicated in phantom), and FIG. 2 being a lateral cross-sectional view of the flow-through assembly 10. As can be seen in FIG. 1, the exterior of the assembly 10 is defined by interconnected components 100, 200, 300, and 400, which may be provided as independent components to facilitate assembly and transport of the assembly 10 within a drilling string, and to further facilitate repair of the drilling string and/or the assembly 10 in the event of failure of an individual component of the assembly 10. The components 100, 200, 300, 400 can be connected using appropriate means, such as threaded connections. The assembly 10 or its individual components can be located in the drilling string above or below other tools, not illustrated; for example, a shock sub or other tool providing oscillation or jarring effects may be disposed either below or above the assembly 10.

Figure 10:
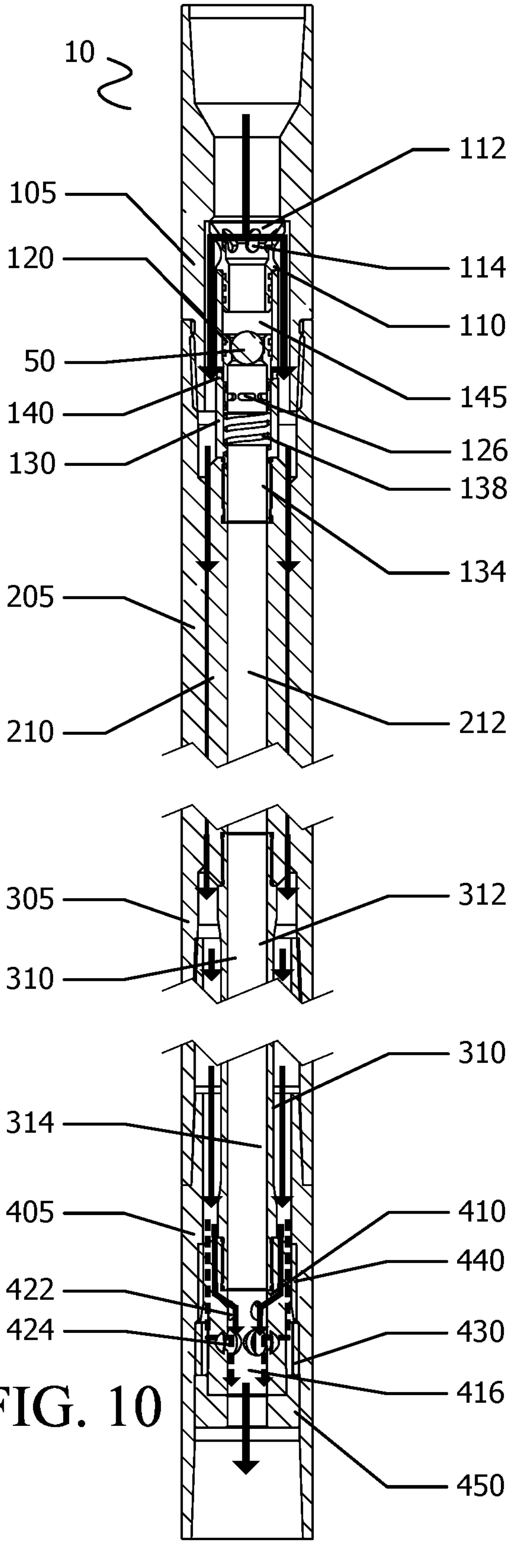

In the particular illustrated example, component 100 is a "ball catch" sub 100 comprising ball catch components used to catch and retain a ball dropped into the drilling string by an operator (as illustrated in FIG. 10) above the rotor of the following motor section 200. The third component 300 is an adaptor or drive section 300 used to transmit torque from the motor of the motor section 200 to the valve assembly comprised in the fourth component, the valve section 400.

Figure 3:
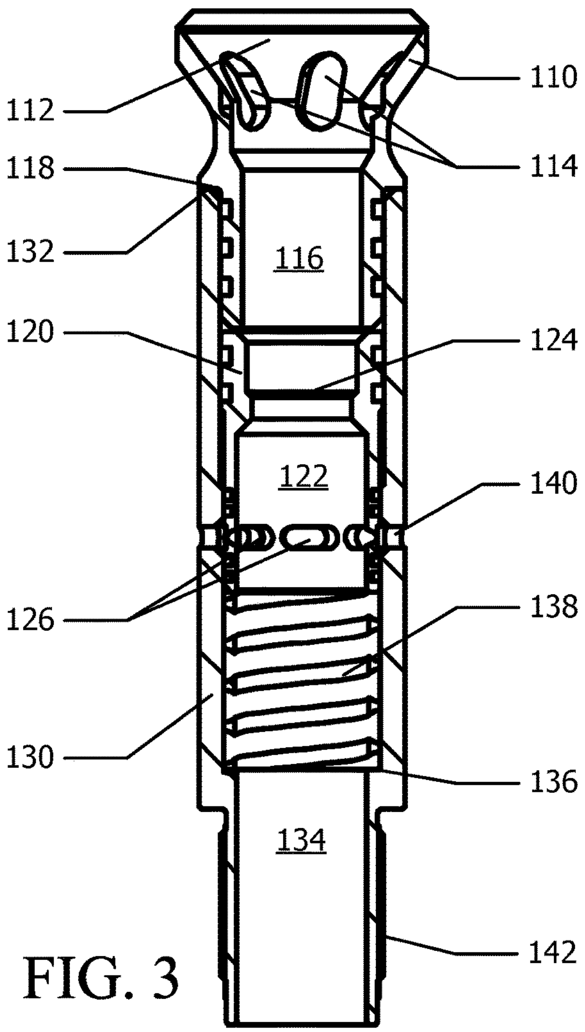
FIG. 3 is a lateral cross-sectional view of a ball catch sub for use in the flow-through pulsing assembly.

Turning to FIG. 2, the ball catch sub 100 includes a housing 105 encasing all or part of a ball catch head 110 and a ball catch seat 120, both of which are retained within a ball catch retainer 130. Each of these components is provided with a through bore 116, 122, 134. A spring 138 or other biasing means is mounted on an interior shoulder 136 defined in a lower portion of the ball catch retainer 130, within the bore 134. A set of one or more bypass ports 140 may be provided in a wall of the ball catch retainer 130 above the interior shoulder 136, to permit passage of fluid between the interior and exterior of the retainer 130. An upper face 132 of the ball catch retainer 130 supports the ball catch head 110. The ball catch head 110 includes a funnel-like opening 112 sized to receive and direct a ball towards the lower, substantially cylindrical portion of the ball catch head 110. The wall of the funnel-like opening 112 is provided with the one or more bypass ports 114 that permit passage of fluid from the interior of the ball catch head 110 to its exterior. The funnel-like opening 112 is in fluid communication with the bore 116. In the example of FIG. 3, the exterior of the ball catch head 110 includes a circumferential flange component 118 that rests on the upper face 132 of the ball catch retainer 130.

The ball catch seat 120 is supported within the interior of the ball catch retainer 130, below the ball catch head 110. A lower face of the ball catch seat 120 rests on the spring 138, and is able to reciprocate up and down within the ball catch retainer 130 as the degree of compression in the spring 138 changes under the force of drilling fluid flow when a ball 50, as shown in FIG. 10, is received on the ball catch seat 120. The ball catch seat 120 is a substantially cylindrical component having a through bore 122 in fluid communication with the bore 134 of the ball catch retainer 130 and the bore 116 of the ball catch head 110, and having a varying interior diameter or surface designed to catch a ball received from the ball catch head 110. The ball catch seat 120 includes an interior shoulder or projection 124. This interior shoulder defines a region of reduced interior bore diameter in the seat 120, and is sized to retain an appropriately sized dropped ball in place and prevent its passage further downward.

When the ball catch assembly is not engaged, fluid entering the ball catch assembly can pass through the ball catch head 110, the bores 116, 122, and 134 and into other components of the assembly 10 below the ball catch assembly. Some fluid may pass through the bypass ports 114 and around the exterior of the ball catch assembly, but most fluid is expected to pass through the head 110 and bores. Thus, fluid entering the ball catch head 110 from above can pass down through the bore 116, or through the bypass ports 114 and thus pass over the outside of the ball catch head 110 and the ball catch retainer 130. When the ball catch assembly is engaged, a projectile such as the ball 50 blocks passage of fluid at the ball catch seat 120; therefore, fluid entering the ball catch assembly will flow through the ports 114 and down around the exterior of the ball catch head 110 and retainer 130 in the space defined between these components and the housing 105, and down to other components of the assembly 10 below the ball catch assembly that are in fluid communication with the exterior of the ball catch head 110 and retainer 130.

Other ball catch assemblies can be used in place of the ball catch sub 100 described above. Other examples of ball catch subs are described in International Applications No. PCT/CA2016/050950, "Selective Activation of Motor in a Downhole Assembly", and PCT/CA2016/051096, "Selective Activation of Motor in a Downhole Assembly and Hanger Assembly", the entireties of which are incorporated herein by reference. Furthermore, implementations of the flow-through assembly 10 may exclude a ball catch sub positioned above the valve section 400.

In the example assembly 10 shown in FIG. 2, rotor 210 is provided with a bore 212 extending through the length of the rotor 210, and the bore 134 is in fluid communication with the bore 212. In the illustrated example, the rotor 210 and ball catch assembly are directly joined by a threaded connection, but they may be connected by an intermediate unit, such as the shaft 310 described below. The illustrated shaft 310 may be referred to as a flow-through shaft, flow-through drive shaft, or flex shaft. For convenience, the shaft 310 is generally referred to as a drive shaft 310 below.

Returning to FIG. 2, the motor section 200 includes a cooperating stator 205 and rotor 210. In the example assembly 10 depicted here, the motor is a Moineau motor, with a multi-lobe rotor 210 rotating in a multi-lobe stator. The rotor 210 in this example, as mentioned above, includes a through bore or passage 212 providing for fluid communication from the bore 134 of the ball catch retainer 130.

Figure 4:
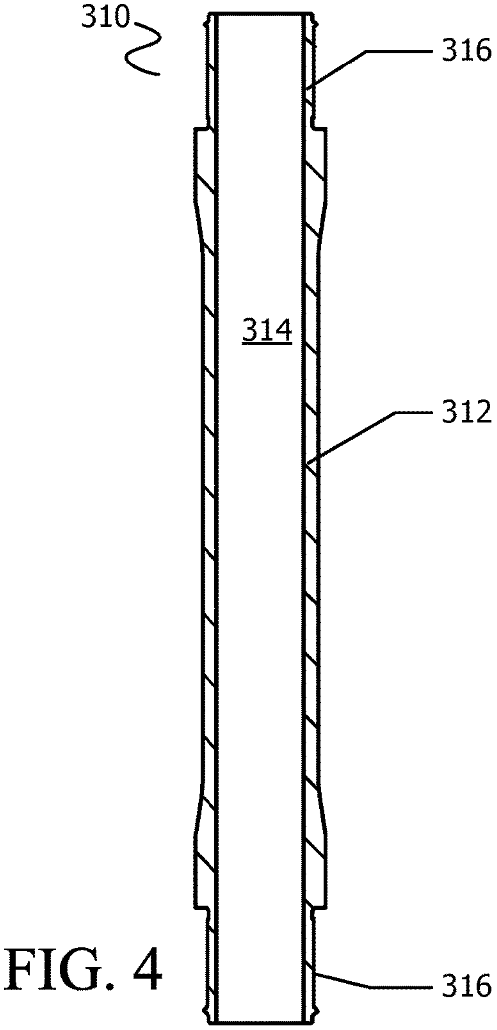
FIG. 4 is a lateral cross-sectional view of a flow-through shaft for use in the flow-through pulsing assembly.

The drive section 300 comprises a housing 305 enclosing at least a substantial part of a flow-through drive shaft 310, thus defining an annular space between the interior diameter of the housing 305 and the outer diameter of the drive shaft 310. The drive shaft 310, which is illustrated in further detail in FIG. 4, comprises a substantially elongated main body 312 with a through bore 314 to permit passage of fluid therethrough. An upper end of the drive shaft 310 is connected to the lower end of the rotor 210, while the lower end of the drive shaft 310 is connected to an upper end of the valve assembly in the valve section 400, and specifically an upper end of the rotary valve component 410. As the bore 314 of the flow-through drive shaft 310 provides for fluid communication between the rotor bore 212 and the variable choke assembly below, suitable joints or connections are provided between the drive shaft 310 and the rotor 210 and the drive shaft 310 and the rotary component 410 to permit fluid communication therethrough. In the particular example illustrated in the accompanying figures, the drive shaft 310 is joined to both the rotor 210 and the rotary valve component 410 by threaded connections 316 to minimize obstruction of any fluid passing through the bore 314. The portions of the drive shaft 310 between the main body 312 and the threaded connections 316 may be enlarged (e.g., with greater wall thickness than the elongated main body 312) to increase the strength of the drive shaft 310 at those points, while still providing the annular space between the exterior of the drive shaft 310 and the interior of the housing 305. For instance, in one non-limiting example, the outer diameter of the drive shaft 310 at the enlarged portions near the threaded connections can be about 2.25 inches, tapering to about 1.825 inches for the rest of the main body 312, while maintaining an interior bore diameter of about 1.5 inches throughout.

Returning again to FIG. 2, the valve section 400 includes a housing 405 enclosing the aforementioned rotary component 410 connected to the flow-through drive shaft 310. The rotary component 410 rotates under influence of the rotor 210 within a radial bearing 440 and on a rotary bearing 450 situated in the housing 405. Flow ports 424 provided in the body of the rotary component 410 enter into and out of engagement with a corresponding stationary component 430, also housed in the housing 405.

Figure 5A:
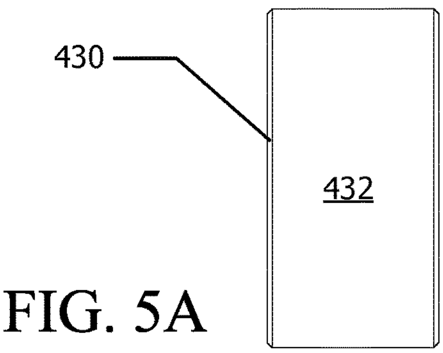
FIGS. 5A and 5B are side elevation and top views, respectively, of a stationary component of a rotating variable choke assembly for use in the flow-through pulsing assembly.
Figure 5B:
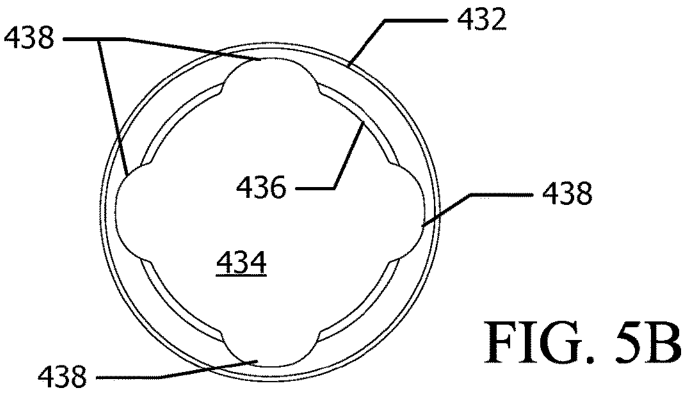

The stationary and rotary components 430, 410 are illustrated in further detail in FIGS. 5A to 6D. Turning first to FIGS. 5A and 5B, the stationary component 430 comprises a substantially annular component sized to fit within the valve section housing 405, and to receive the rotary component 410 within the stationary bore 434. The interior face 436 of the stationary component 430 provides the bore 434 with a substantially cylindrical configuration, with one or more channels 438 creating regions of increased bore diameter. The diameter of the bore 434 is sized to fit the rotary component 410 and to permit fluid access to the flow ports 424 of the rotary component 410 when the flow ports 424 are at least partially coincident with a corresponding channel 438, and to substantially block fluid access when the channels 438 are not coincident with the ports 424, as shown in further detail with reference to FIGS. 7A to 8B.

Figure 6D:
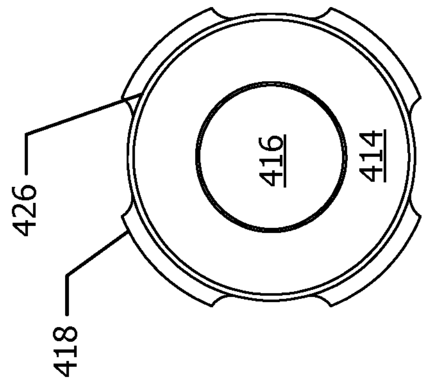
FIGS. 6A, 6B, 6C, and 6D are a top view, a side elevation, a bottom view, and a lateral cross-sectional view, respectively, of a rotary component of the variable choke assembly.
Figure 6A:
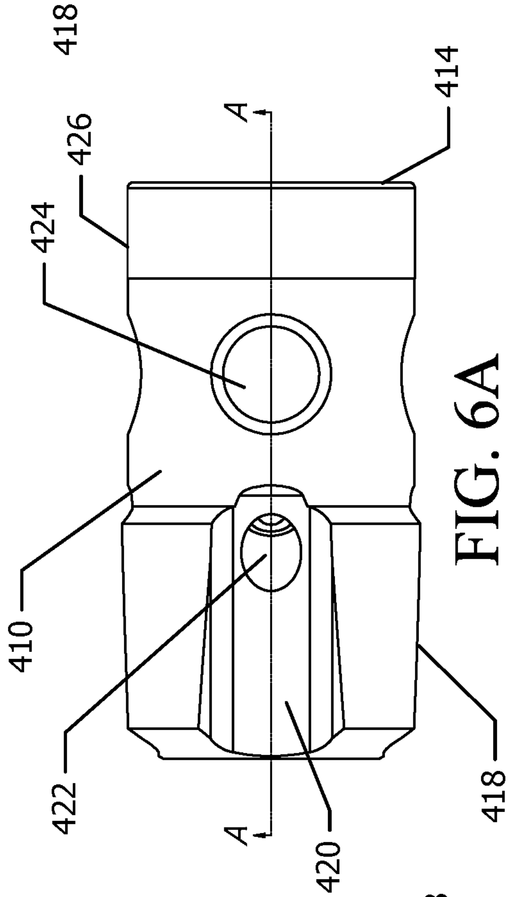
Figure 6B:
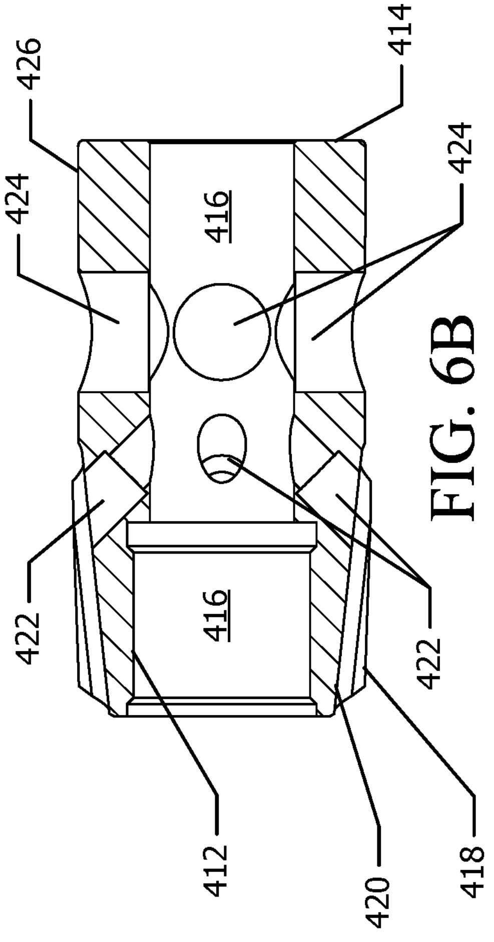
Figure 6C:
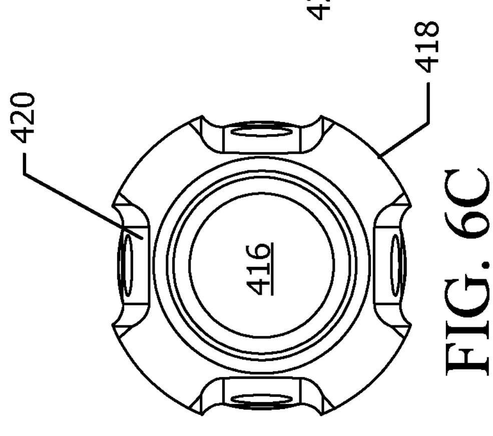

FIG. 6A illustrates a side elevational view of the rotary component 410, while FIG. 6B provides a view of the cross-section of the view of FIG. 6A taken along plane A-A, and FIGS. 6C and 6D illustrate top and bottom view of the rotary component 410, respectively. The rotary component 410 in this particular example is substantially cylindrical or bullet-shaped, with a slightly tapered upper portion. The body of the rotary valve component 410 includes a bore 416 extending from the bottom to the top of the component 410, thus providing for fluid flow straight through the body. The rotary component 410 also includes at least one bypass port 422 and at least one flow port 424, which provide for fluid communication between an exterior of the rotary valve component 410 and the bore 416. As can be best seen in FIGS. 6A and 6B, the outlets of the bypass ports 422 on the exterior surface of the component 410 are disposed within recessed facets 420 of the valve component's exterior. These facets originate at a midsection of the component 410 and extend towards the top of the component 410 at an incline, such that they are angled towards the centre of the body (i.e., towards the bore 416) at towards the top of the component 410. This provides a slightly tapered profile to the generally cylindrical shape of the component 410, such that the circumference or perimeter at the top of the component 410 is smaller than at a point around the midsection of the component 410.

The flow ports 424 are provided at or around the midsection of the rotary valve component 410, and are generally laterally aligned with the bypass ports 422; as can be seen in the illustrated examples, the flow ports 424 are located directly below the bypass ports 422. As may be better appreciated with reference to FIG. 8A, this permits drilling fluid flowing downwards in the annular space between the drive shaft 310 and the interior of the housing 305, 405 to enter into the bypass ports 422, as well as the flow ports 424 of the rotary component 410, provided access to the flow ports 424 are not blocked by the stationary component 430 as discussed below.

Fluid access to the bypass ports 422 and flow ports 424 from above the rotary component 410 can be enhanced by further angling or tapering of the upper portion of the component 422; for example, the remaining upper exterior surfaces 418 of the component 410 are likewise angled towards the top of the component 410, as can be seen in FIGS. 6A and 6B.

Figure 7A:
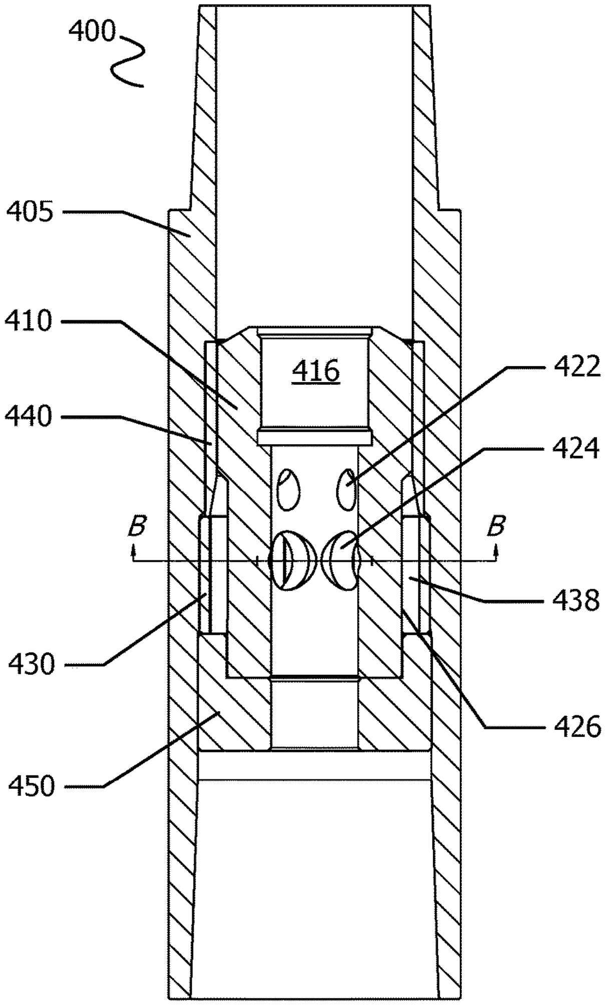
FIGS. 7A and 7B are a lateral cross-sectional view and an axial cross-sectional view, respectively, of the variable choke assembly when the stationary component and rotary component are in a first alignment.
Figure 8A:
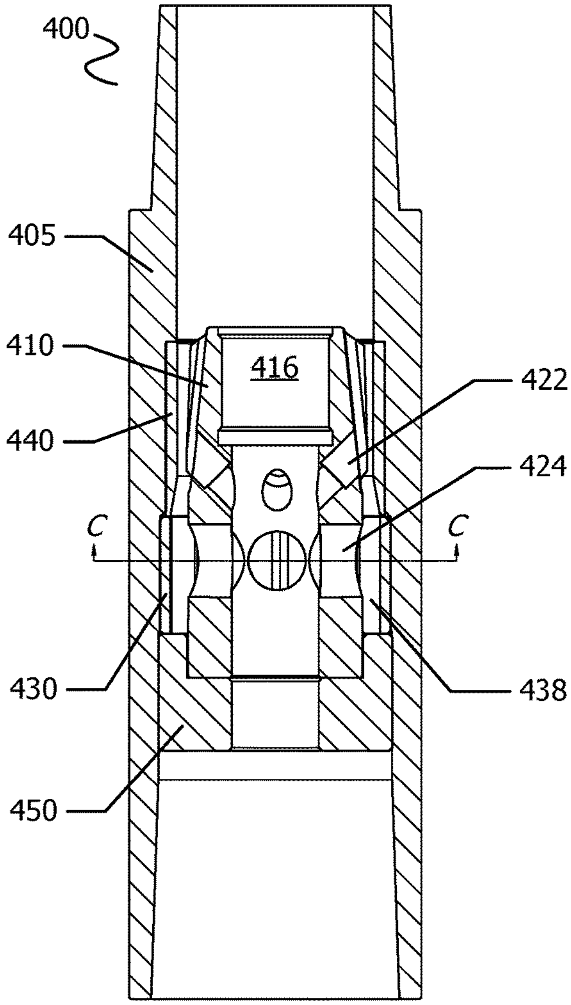
FIGS. 8A and 8B are a lateral cross-sectional view and an axial cross-sectional view, respectively, of the variable choke assembly when the stationary component and rotary component are in a second alignment.
Figure 7B:
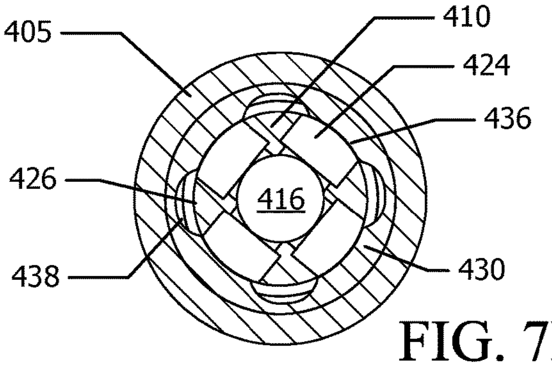
Figure 8B:
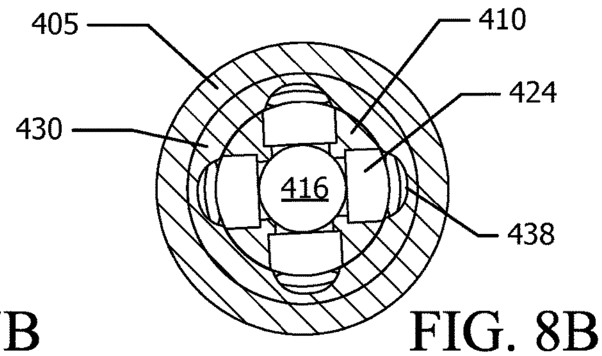

FIGS. 7A and 7B illustrate the variable choke assembly in a "choked" position, while FIGS. 8A and 8B show the variable choke assembly in an "open" position. The rotary component 410 can enter into and out of these positions as it rotates inside the stationary ring component 310 while driven by the rotor 210; when the rotor 210 is not rotating, the rotary component 410 may be positioned in the "open" position, the "choked" position, or an intermediate position. If the rotor is in a lower output state (lower rate of rotation or output torque), the rotary component 410 will move between the "open" and "choked" positions. As can be seen in FIG. 7A, the rotary component 410 rests and rotates on the rotary bearing 450 disposed within the valve section housing 400. The rotary bearing 450 is substantially annular and thus permits passage of drilling fluid from the bore 416 of the rotary component 410 to the components of the drilling string below the valve section 400. The stationary component 430 surrounds the rotary component 410 around the midsection of this latter component at about a level of the flow ports 424; the bypass ports 422 are positioned above the stationary component 430.

In the "choked" or "restricted" position, the outlets of the flow ports 424 are substantially blocked because the interior face 436 of the stationary component 430 contacts the exterior of the rotary component 410 above the flow ports 424, thereby cutting off fluid access to the flow ports 424. However, even in the "choked" state, the bypass ports 422 will still remain unblocked since the outlets of those ports 422 are disposed on a recessed upper portion of the rotary component 410, as discussed above. In addition, regardless whether the variable choke assembly is in the "choked" or "open" state, the bore 416 still permits passage of drilling fluid, drilling string instruments, and blocking projectiles to the downhole portions of the drilling string (assuming that the ball catch assembly is not engaged and blocking through passage), even when the rotary component 410 is rotating.

In the "open" position, as shown in FIGS. 8A and 8B, the flow ports 424 are substantially aligned with the channels 438 in the stationary component 410; thus, fluid can enter into the channels 438 and thence into the flow ports 424 and the bore 416. In a partially "open" position, the flow ports 424 are only partially aligned with the channels 438, so less fluid can enter the channels 438 and the flow ports 424. The bypass ports 422 remain open because the outlets of the ports 422 are disposed on a recessed portion of the rotary component 410 above the stationary component 430. The flow rate through the flow ports 424 can be adjusted by altering the interior dimensions and distribution of the flow ports 424 around the rotary component 410, and/or by altering the dimensions of the recesses 438 in the stationary component 430. For example, the interior dimensions of the flow ports 424 can be reduced with an optional lining, such as a carbide insert (not shown).

Figure 9:
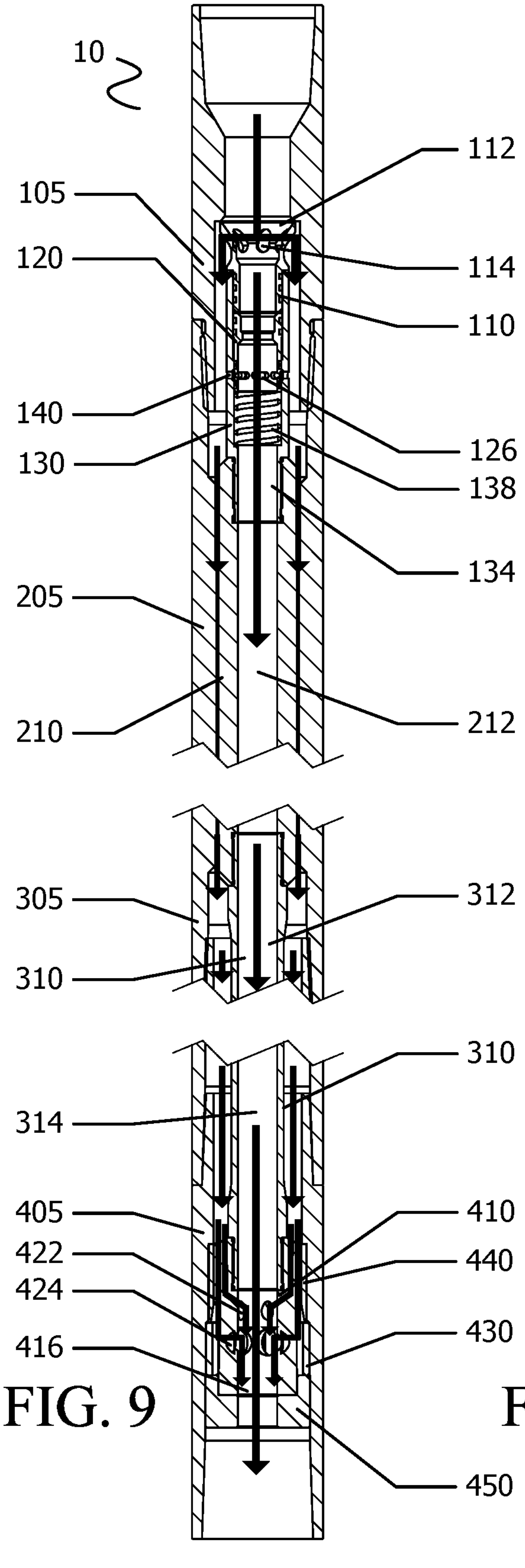
FIGS. 9 and 10 are cross-sectional views of the flow-through pulsing assembly with the ball catch sub in a first state and a second state of engagement, respectively.

The operation of the flow-through assembly 10 can be understood by referring to FIGS. 9 and 10, which illustrate the effect on drilling fluid flow when the rotating variable choke assembly is activated. In FIG. 9, the ball catch assembly is not in an engaged state. No projectile 50 is in place in the ball catch seat 120; consequently, drilling fluid entering the ball catch assembly from above can flow into the bore 134 of the ball catch retainer 130 and into the bore 212 of the rotor 210, as indicated by arrows in FIG. 9. The fluid exits the bore 212 and passes through the bore 314 of the drive shaft 310, and the bore 416 of the rotary component 410. Some drilling fluid may still flow around the exterior of the ball catch retainer 130 and enter the motor. Since most fluid enters the bore 212, the rotor 210 will be either stalled or in a low output state.

The fluid then passes into the bore 416 of the rotary component 410. Most drilling fluid entering the ball catch assembly will pass through the centre bore 212 of the rotor, then bores 314 and 416. However, if any fluid happens to reach the exterior of the rotary component 410, it may enter one of the bypass ports 422 and enter the bore 416 in that way; and if the rotary component 410 is in an "open" or partially-"open" position, some fluid may even enter the bore 416 via the flow ports 424 to the extent they are not blocked off. Thus, when the ball catch assembly is in the non-engaged state, the substantial part of the drilling fluid flows through the communicating bores of the various components with minimal variation in fluid pressure.

On the other hand, when the ball catch assembly is in the engaged state as in FIG. 10, a ball 50 or other blocking projectile is seated in the ball catch seat 120. This causes drilling fluid to be substantially blocked from passing through the bore 134. As indicated by the arrows in FIG. 13, drilling fluid is therefore directed from the ball catch head 110, through the ports 114 in the funnel 112, and down the exterior of the ball catch retainer 130 toward the cavities of the motor defined by the rotor 210 and stator 205. This provides sufficient flow to activate the motor, causing rotation of the rotor 210, or to significantly increase the output of the motor, thereby driving the rotary component 410 of the variable choke assembly (at a higher rate). Minimal fluid will pass through the rotor bore 212 and drive shaft bore 314. The drilling fluid exiting the motor passes around the exterior of the drive shaft 310 and the exterior of the rotary component 410, which is rotating. Some fluid will enter the bypass ports 422 of the rotary component 410, while other fluid will intermittently enter the flow ports 424 as rotary component 410 rotates and the flow ports 424 move into and out of alignment with the channels 438 in the stationary ring component 430, as indicated by the phantom arrows in FIG. 10.

Figure 13:
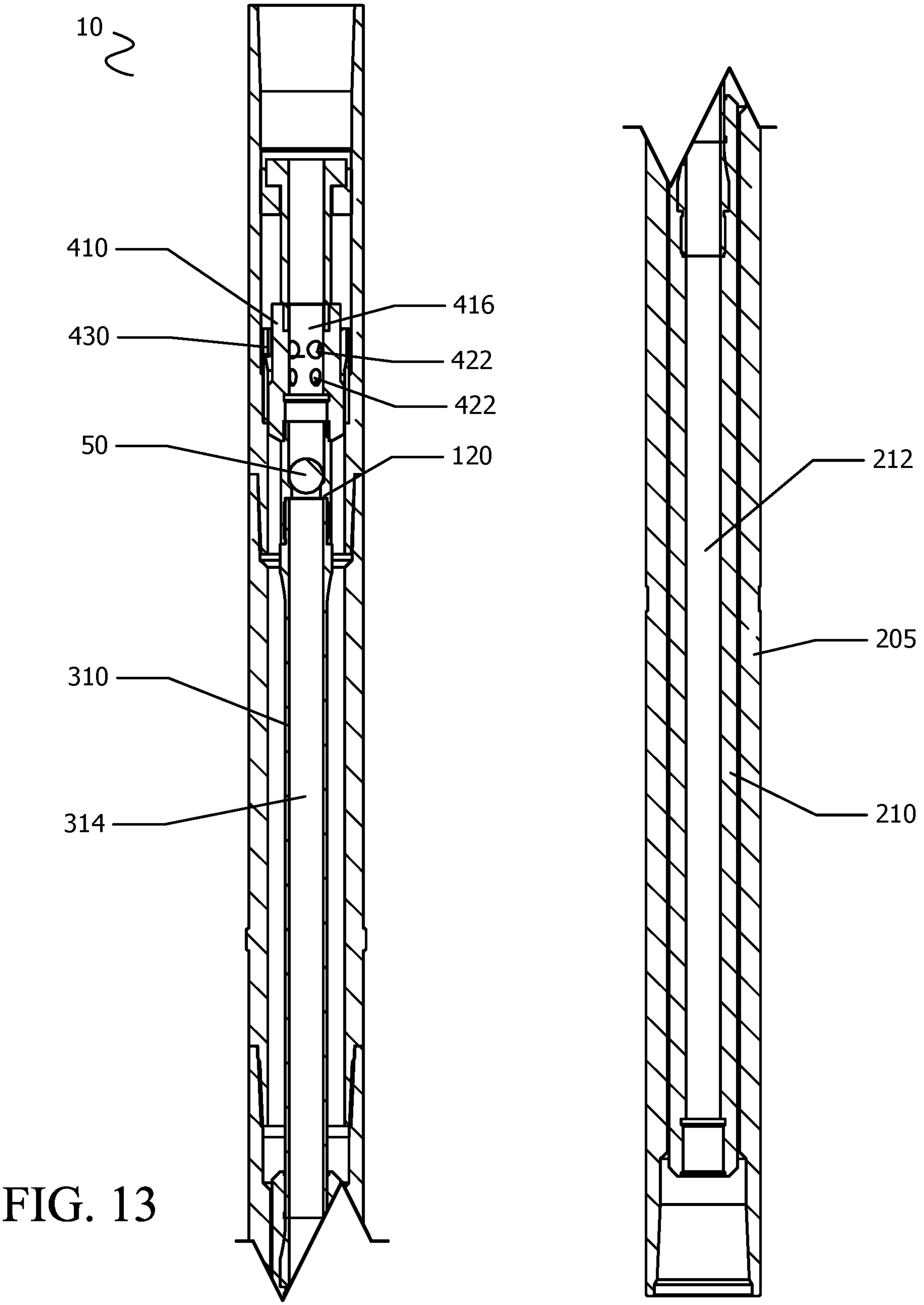
FIG. 13 is a cross-sectional view of another configuration of the flow-through pulsing assembly.

The varying rate of fluid consequently entering the bore 416 will produce variations in the fluid pressure above the rotary component 410. The fluid pressure will vary between a minimum and maximum value, as the rotary valve component 410 rotates from the "choked" to "open" position. The resultant pressure variations can be used to operate an oscillation, friction, or impulse tool in the drilling string. It will be appreciated that even while pressure variations are being generated by the variable choke assembly, the assembly 10 still permits a significant amount of fluid to flow downstream to other drilling string components, such as the bottom hole assembly. This is because the rotary component of the variable choke assembly includes the bypass ports 422, permitting drilling fluid to bypass flow ports 424 even when the flow ports 424 are closed.

Where the assembly 10 as depicted in FIG. 1 is included in a drilling string, an oscillation or impulse tool may be mounted either uphole, above the assembly 10, or downhole, below the assembly 10. The variations in fluid pressure caused by the operation of the rotary variable choke assembly may be transmitted a distance uphole, beyond the ball catch assembly, for example. Furthermore, it will be appreciated by those skilled in the art that in some drilling string arrangements, the various components of the assembly 10 can effectively be arranged in reverse order, with the valve section 400 uphole of the ball catch component 100 or a variant of the ball catch component 100. FIG. 13 illustrates an example arrangement of an assembly 10 in which the rotary component 410 and stationary component 430 of the rotating variable choke assembly are retained in an inverted position at a top end of the assembly 10. The rotary component 410 is connected to a ball catch assembly; FIG. 13 illustrates a simple version having a ball catch seat 120 without a funnel-like ball catch head, since a projectile would first pass through the bore 416 of the rotary component 410, so the rotary component functions as the ball catch head. The ball catch assembly, in turn, is in fluid communication with the bore 212 of the rotor 210, which is positioned below the rotary component 410 and the ball catch assembly. In this example, the ball catch assembly and the rotor 212 are connected by a flow-through drive shaft 310, which provides for fluid communication through its bore 314 and also transmits torque generated by the rotor 210 to the ball catch assembly and rotary component 410.

When the ball catch assembly is not engaged, no projectile 50 is in place on the ball catch seat 120, and drilling fluid entering the rotary component 410 passes through the rotary component bore 416, the ball catch assembly, the drive shaft bore 314, the rotor bore 212 in a manner similar to that described above. Minimal pressure variation is produced by the assembly 10. When the ball catch assembly is engaged, the projectile blocks passage of drilling fluid down the central bores 314 and 212. Drilling fluid enters the bore 416 from above, but the blockage of the bores 314 and 212 causes fluid to flow out through the bypass ports 422, which remain unblocked as described above, and through the ports 424 provided exit from the ports 424 is not blocked by the stationary component 430. This results in drilling fluid flow downwards around the exterior of the drive shaft 310, and into the motor. This activates the motor, generating torque, which is transmitted from the rotor 210 to the ball catch assembly and rotary component 410 by the drive shaft 310. As the rotary component 410 rotates, it will move between the "choked" and "open" positions described above, thereby varying the fluid pressure above the rotary component 410. Again, the pressure variations generated by the assembly 10 can be used to operate an oscillation, friction, or impulse tool.

In some implementations, the ball 50 can be manufactured of a durable, shatter-resistant material, such as stainless steel. In that case, once in place, the ball 50 is removable by retracting the assembly 10 to the surface, and disassembling a sufficient portion of the assembly 10 to retrieve the ball 50. If the ball 50 has a sufficiently magnetic composition, then the ball may be retrieved by passing a rod or probe with a magnet affixed thereto to attract and withdraw the ball 50 from the assembly.

In other implementations, the ball 50 can be manufactured of a breakable material, such as Teflon®. When such a ball 50 is in place as in FIG. 10 and the motor is active, the motor can be substantially stopped or slowed down by dropping a fracture implement (not shown), such as a smaller steel ball, to shatter to the ball 50 without retracting the assembly 10 to the surface. If the fracture implement has a smaller diameter than the various bores of the components in the assembly 10, it may pass through the assembly 10 without substantially blocking fluid flow therethrough. Thus, it could be possible to selectively engage and disengage the ball catch sub 100, thereby activating or deactivating the motor section 200 and the valve section 400 as desired to selectively provide a pulsing fluid flow through the drilling string.

Figure 11A:
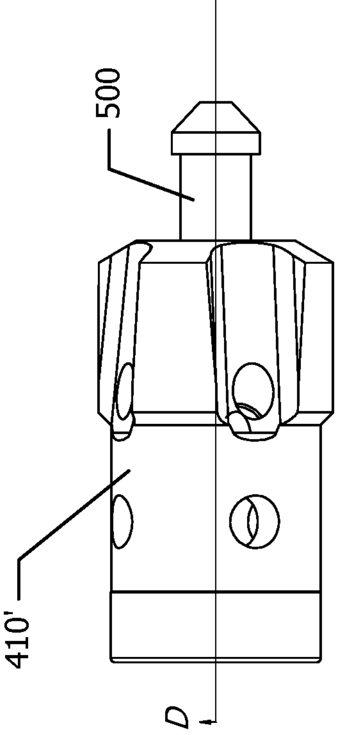
FIGS. 11A and 11B are side elevation and lateral cross-sectional views of an alternative variable choke assembly with a dart flow restrictor.
Figure 11B:
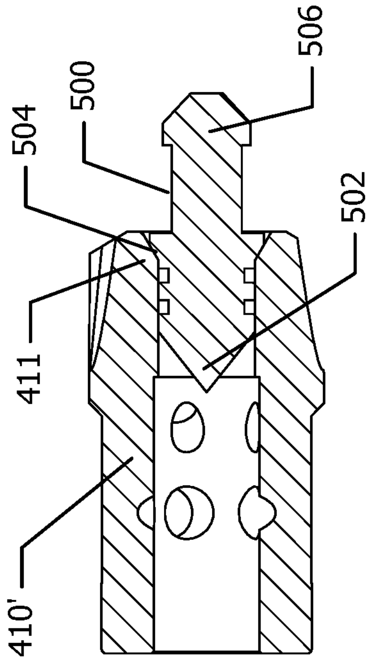

It will be appreciated by those skilled in the art that modifications can be made to the ball catch component 100. For example, as shown in FIGS. 11A and 11B, the operation of the ball catch component 100 can be effectively integrated into the valve section 400. FIG. 11A shows a side elevational view of the modified rotary component 410' with a dart plug 500 seated therein. FIG. 11B shows a cross-sectional view of this modified component 410' and plug 500 taken along axis D-D. The modified component 410' includes an interior seat 411 defined by the interior diameter of the component 410', which is sized and shaped to receive a corresponding seating portion 504 of the plug 500. The plug 500 includes a leading end 502 and an opposing head end 506. The leading end 502 in this example is tapered to a tip; the seating portion 504, which is located between the ends 502 and 506, is an exterior diameter tapering in size towards the leading end 502. The overall shape of the plug 500, particularly as defined by tapered profile of the leading end 502 and the seating portion 504, assists in seating the plug 500 in the modified valve component 410' when it is dropped into the drilling string. Seals may be provided on the exterior of the plug 500 to engage the interior wall of the modified valve component 410', so as to prevent drilling fluid flow around the plug 500. Optionally, the head end 506 of a plug 500 can be provided with a hook or hole that is capable of being engaged by a wireline tool so that the plug 500 can be retracted through the drilling string without requiring disassembly.

In the foregoing example, plug 500 is received in what was previously described as the upper portion of the rotary component 410, above. Thus, in this modified example, end of the modified component 410' is connected to a rotor at the opposing end. When assembled in the drilling string, the valve section containing the modified valve component 410' would be located uphole from the motor section 200, rather than downhole as illustrated in the earlier example. In this example, the ball catch component 100 is not required; the modified valve component 410' operates to selectively activate or deactivate an oscillation or impulse tool in the string.

Figure 12A:
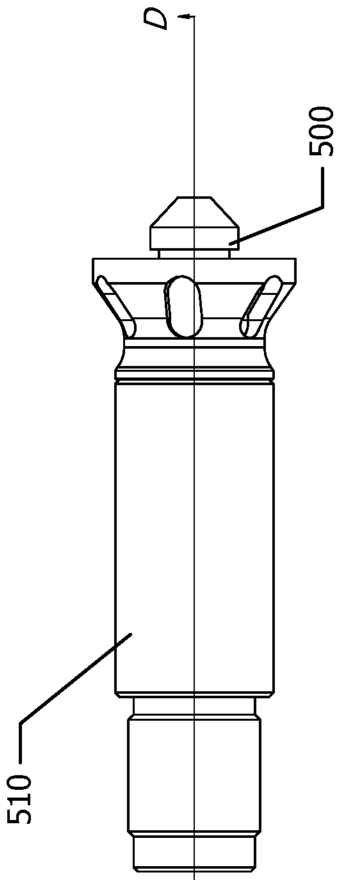
FIGS. 12A and 12B are side elevation and lateral cross-sectional views of a ball catch assembly with a dart flow restrictor.
Figure 12B:
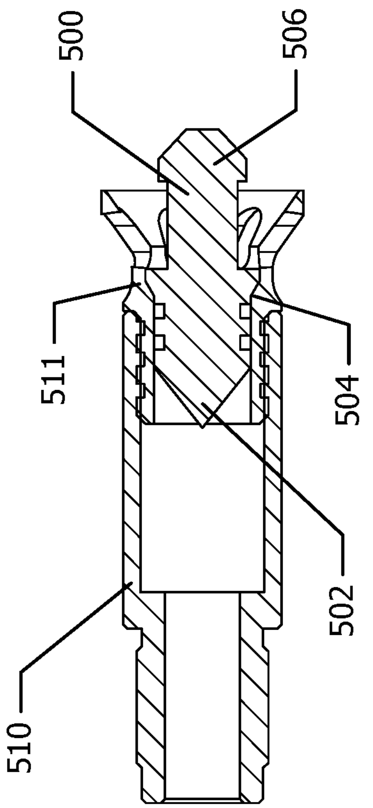

Another variant in the ball catch component 100 is illustrated in FIGS. 12A and 12B. In this example, rather than provide separate ball catch head 110, ball catch seat 120, and ball catch retainer 130 components, a single integrated ball catch unit 510 is provided, similar to the ball catch described in U.S. Provisional Application No. 62/220,859, which is incorporated herein by reference. The dart is received in the ball catch unit 510 and sits against an interior seat 511, similar to the interior seat 411 depicted in FIGS. 11A and 11B.

FIGS. 14 to 23 illustrate a further embodiment of the variable choke assembly 600 that can be used with the flow-through pulsing assembly described above, or in other assemblies requiring a pulsing or variable fluid flow driven by a rotor. It will be appreciated by those skilled in the art that despite the inclusion of seals in a downhole assembly, some leakage may occur. Where two components rotate against each other, as in rotary valves or rotary choke assemblies such as the variable choke assembly described above, some leakage can occur during rotation due to slight transverse motion of one component, which may be due to the eccentric orbit of the rotor driving the rotational motion. Leakage of drilling fluid can result in an undesired drop in fluid pressure downstream of the leakage points. These drops in fluid pressure may require an increase in fluid pressure at the surface to compensate, but this in turn may accelerate wear on components upstream from the leakage points. Thus, in the embodiment of FIGS. 14 to 23, the rotary and stationary components of the variable choke assembly are provided with complementary tapered faces that reduce leakage due to transverse motion.

Figure 14:
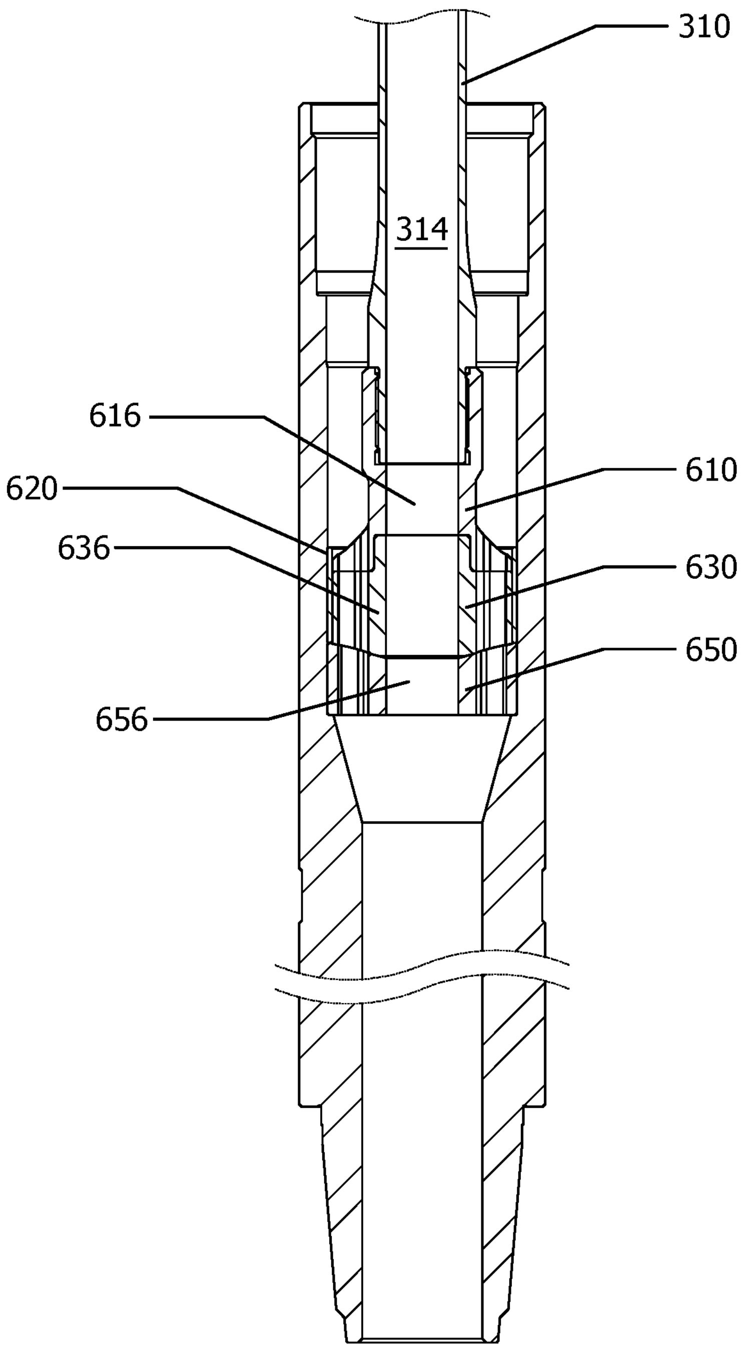
FIG. 14 is a lateral cross-sectional view of a portion of the flow-through pulsing assembly with a further variable choke assembly.
Figure 15A:
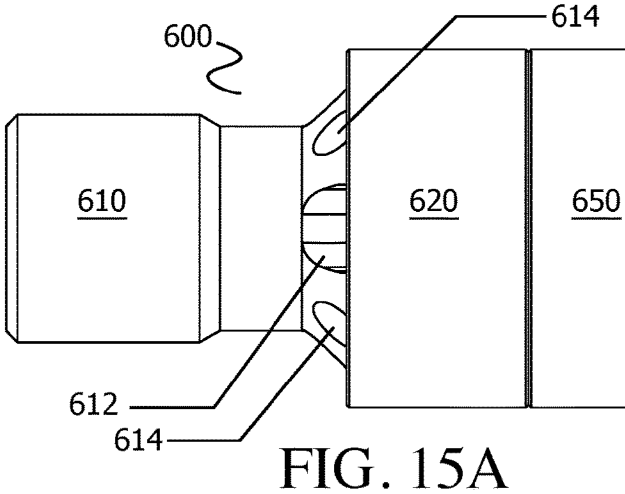
FIGS. 15A and 15B are side and bottom views of the further variable choke assembly of FIG. 14.
Figure 15B:
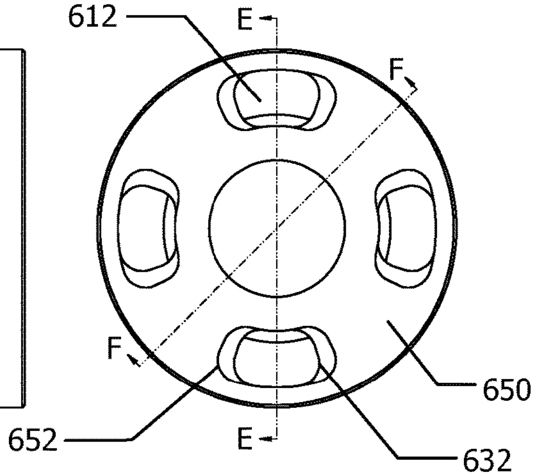

FIG. 14 depicts the relevant components of the variable choke assembly below the drive shaft 310. A stationary component 650 of the variable choke assembly with a through bore 656 receives a corresponding rotary component 630 with a corresponding through bore 636. As can be seen from the following figures, the rotary component 630 and stationary component 650 engage each other with complementary tapered surfaces. In the embodiment illustrated in FIGS. 14 to 23, the rotary component 630 is mounted to the end of the drive shaft 310 by means of an adaptor shaft component 610, which is also provided with a through bore 616. At one end, the bore of the adaptor shaft component 610 can be threaded for connecting to the drive shaft 310; the other end can be threadedly connected to the rotary component 630. The rotary component 630 rotates on the stationary component 650 within a radial bearing 620 mounted within the housing of the downhole assembly, as can be seen in FIG. 15A.

FIGS. 15A to 16B illustrate the assembled adaptor shaft component 610, rotary and stationary components 630, 650, and radial bearing 620. These components can be manufactured from a carbide; the adaptor shaft component 610 may be manufactured from stainless steel. In addition to their corresponding bores 616, 636, 656, each of the adaptor shaft component 610, rotary component 630, and stationary component 650 are provided with ports that can enter into and out of alignment with each other as the rotary component 630 rotates against the stationary component 650.

Figure 16A:
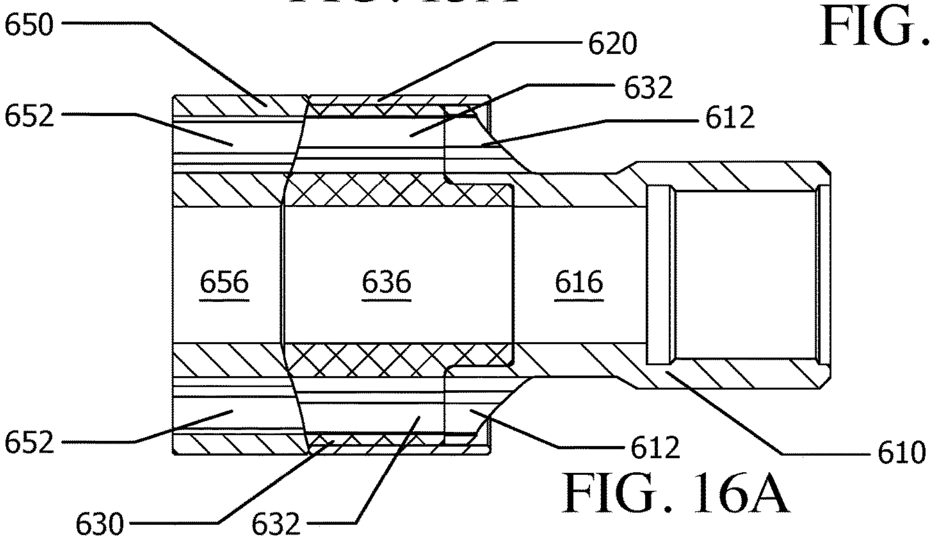
FIGS. 16A and 16B are lateral cross-sectional views of the further variable choke assembly taken along axes E and F, respectively, indicated in FIG. 15B.

The stationary component 650 is provided with one or more ports 652 passing through the body of the component 650, around the through bore 656. The ports are aligned to be substantially, but not necessarily, parallel to the through bore 656. The cross-sectional shape and area of each port 652 may be the same, or different, depending on the desired pulsing effect of the variable choke assembly 600. Similarly, they need not be spaced in regular intervals around the bore 656. In the illustrated embodiment, each port 652 has a rounded arcuate cross-sectional opening, as discussed below. The rotary component 630 is provided with one or more ports 632 in its body, spaced around the through bore 636. Again, the ports in the rotary component 630 need not be identically shaped or regularly spaced around the through bore 636, depending on the desired pulsing effect; but in this example, the ports are identically shaped and arranged at regular intervals around the bore 636. The ports 632 have a cross-sectional shape similar to, but shorter in length than, the ports 652 in the stationary component 650. As can be seen in FIG. 16A, the adaptor shaft component 610 is provided with corresponding ports 612 which align with the ports 632 of the rotary component 630 when these two components are joined together. In some implementations, the rotary component 630 can include an adaptor for mounting to the end of a drive shaft 310 or other component, thereby avoiding the need for a separate adaptor shaft component 610.

Figure 16B:
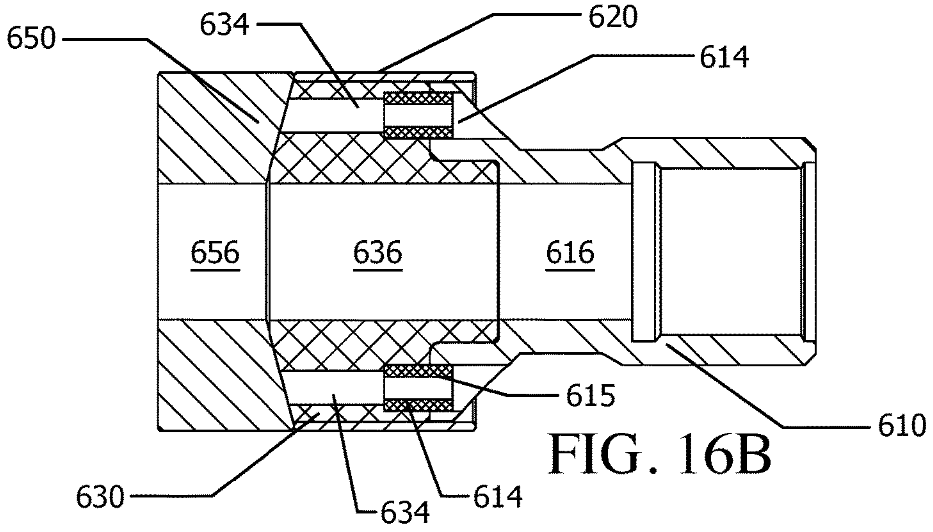

In the embodiment illustrated in the figures, the adaptor shaft and rotary components 610, 630 are also provided with at least one bypass port 614, 634 respectively. These ports 614, 634 also align with each other when the adaptor shaft component 610 is mounted to the rotary component 630. A carbide insert 615 is inserted in the bypass port 614 to reduce its circumference to control flow through the bypass port 634. In the illustrated embodiment, four bypass ports 614, 634 alternate with the ports 612, 632. In the illustrated configuration, when the ports 652 and 632 are in complete alignment, as illustrated by the bottom view of FIG. 15B and FIG. 16A, the bypass ports 614, 634 are blocked by the solid body of the stationary component 650, as shown in FIG. 16B.

Figure 17:
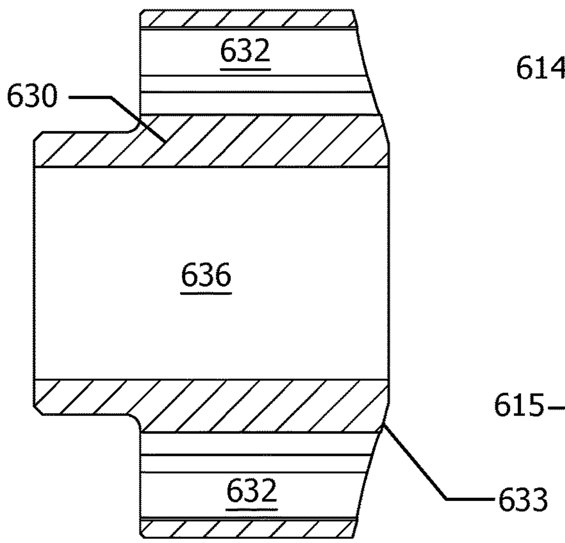
FIGS. 17 and 18 are lateral cross-sectional views of the rotary and stationary components, respectively, of the further variable choke assembly.
Figure 18:
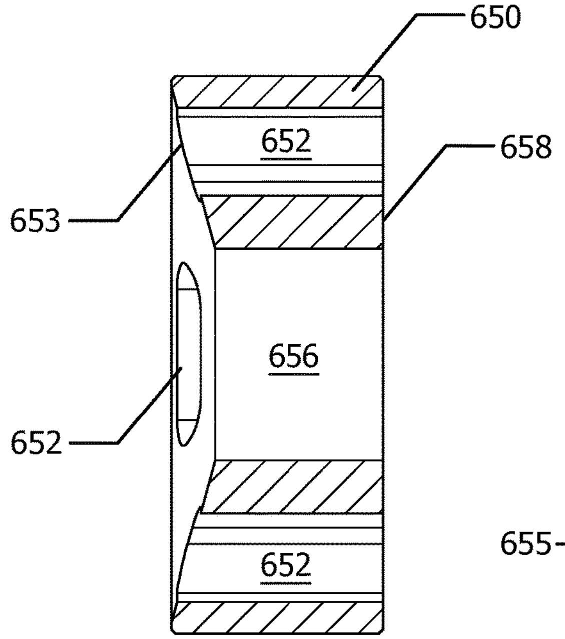

FIGS. 17 and 18 show the rotary and stationary components 630, 650 in isolation. In these views, the tapered bottom surface 633 of the rotary component 630 can be clearly seen. The bottom surface 633 is effectively inclined upward from the centre of the component 630 (i.e., the portion of the component comprising the through bore 636) towards the outer edge of the component 630. In this example, the incline is a 15 degree angle. The stationary component 650 is provided with an upper surface 653 with a complementary inclination downward from the edge of the component 650 towards the centre. Thus, when assembled, the rotary component 630 sits in the stationary component 650. As the rotary component 630 rotates in the stationary component 650, the ports 632 and 652 move into and out of alignment with each other; similarly, the bypass ports 624 move out of and into alignment with the ports 652. As the rotary component 630 rotates, the inclined or tapered shape of the interface between the two components 630, 650 reduces transverse or sideways travel, since the upper surface 653 of the stationary component 650 interferes with transverse movement of the rotary component 630.

Figure 19A:
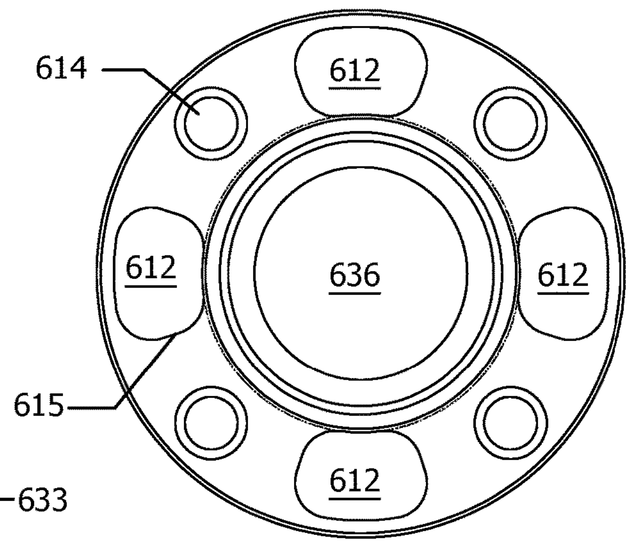
FIGS. 19A and 19B are a top view of the adaptor and bottom view of the stationary component, respectively, of the further variable choke assembly.
Figure 19B:
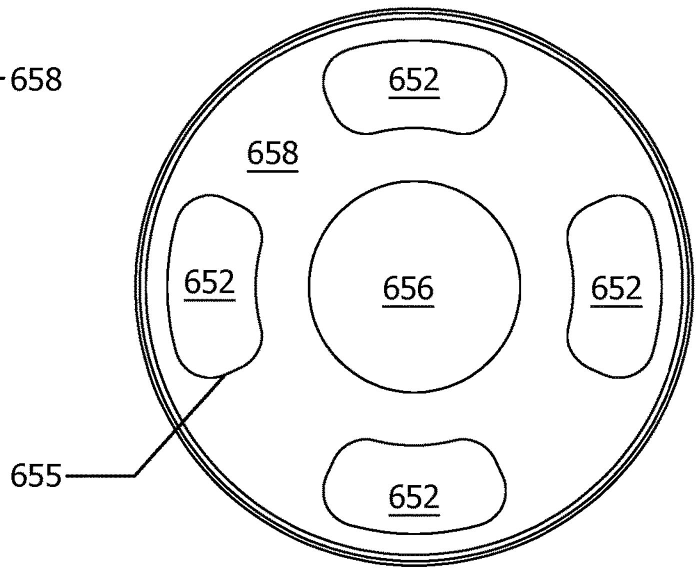

FIG. 19A illustrates the arrangement and shape of the ports 612 and/or 632, and the bypass ports 624 and/or 624 of the adaptor shaft and rotary components 610, 630, while FIG. 19B illustrates the arrangement and shape of the ports 652 in the stationary component 650. In the illustrated example, the ports 612, 632, 652 have a cross-section that may be described as a slightly arcuate ring section with rounded corners, or a kidney shape with flattened leading edges (see for example 615 and 655). The bypass ports 614 may have a similar shape, but in this embodiment, have a circular cross-section. The bypass ports 614 and ports 612, 632 in the rotating components have a smaller cross-sectional area than the stationary component ports 652. The cross-sections of the ports 612, 632, in particular, are shorter in length than the cross-sections of the ports 652, such that the entire cross-section of the ports 612, 632 will intersect with the cross-section of the stationary component ports 652 for a period of time as the rotary component 630 (and adaptor shaft component 610) rotates in the stationary component 650. This provides additional time for the rotary/adaptor shaft components 630/610 to dump the fluid within their ports 632/612 before the ports move out of alignment. The flat leading edges 615, 655 of the ports maximize the cross-sectional area available to permit fluid flow as the ports move into and out of alignment. As the person skilled in the art would appreciate, if the ports of the rotary and stationary components had a circular cross-section, as they move into and out of alignment the intersection of the ports would define a small biconvex lens shape, increasing to an circular shape, then immediately reducing to a small biconvex lens shape again. In other words, minimal time would be spent with the ports in maximal alignment. By providing larger ports 652 in the stationary component 650, the ports 632 of the rotary component 630 will remain in maximal alignment with the ports 652 for longer than if the ports 632, 652 were the same size. In addition, by squaring off the leading edges (and optionally trailing edges, as illustrated in the drawings), the ports 632, 652 provide for more throughput as they move into and out of alignment.

Figure 20:
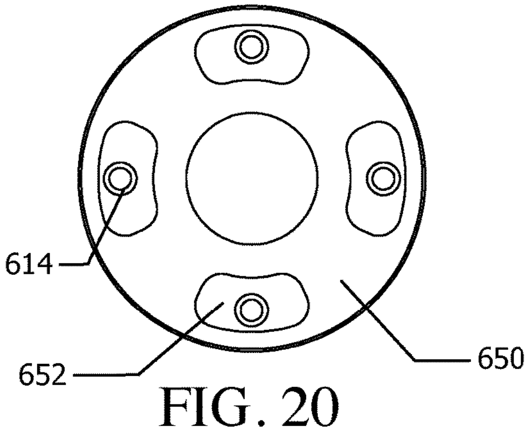
FIGS. 20 and 21 are bottom and side views, respectively, of a portion of the flow-through pulsing assembly with the further variable choke assembly in a first alignment.
Figure 21:
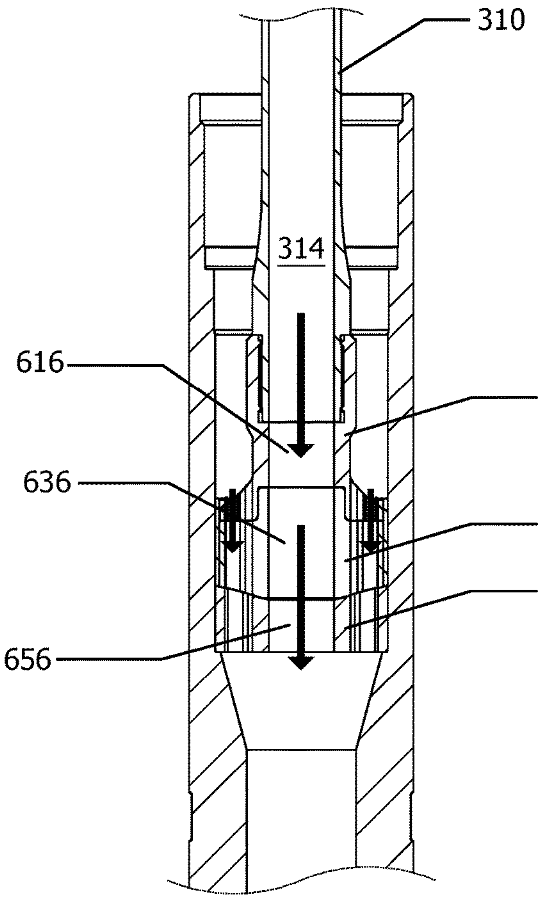

FIGS. 20 to 23 illustrate this variable choke assembly in first and second alignments within a drilling string. As illustrated in FIG. 20, in a first alignment, or "choked" or "restricted" state, fluid flow through the entire assembly is restricted by the bypass ports 614/624, which intersect the ports 652 of the stationary component 650. The size and position of the bypass ports and other ports in the rotary/adaptor shaft components 630/610 can be selected so that at least one port of the rotary/adaptor shaft components is at least partially aligned with a port 652 at any time; although in other embodiments, all ports may be completely blocked at some point during rotation. When the variable choke assembly is in this "choked" state, fluid flow may be restricted as shown in FIG. 21. If fluid is flowing down the bore 314 of the drive shaft 310, it will pass through the corresponding bores of the variable choke assembly. Fluid passing on the outside of the drive shaft 310 (i.e., fluid that did not bypass the motor, as shown in FIGS. 9 and 10) will enter the bypass ports 614/624 and exit through the stationary ports 652 when they are aligned.

Figure 22:
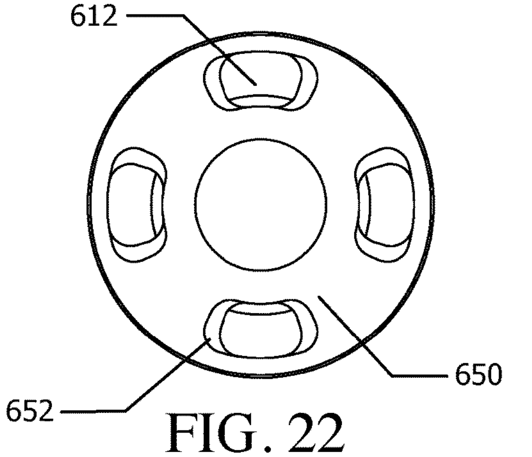
FIGS. 22 and 23 are bottom and side views, respectively, of the portion of the flow-through pulsing assembly with the further variable choke assembly in a second alignment.
Figure 23:
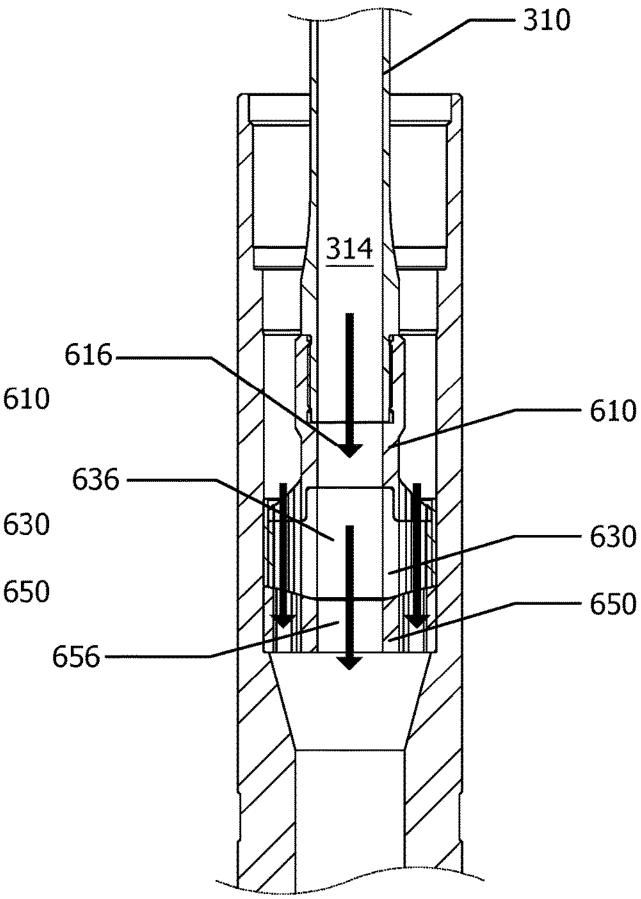

FIG. 22 illustrates a second alignment, or "open" state, when the ports are maximally aligned, enabling as much drilling fluid as possible to be dumped through the ports 652. As shown in FIG. 23, fluid flow through the variable choke assembly will be at its greatest when the ports are all aligned. Thus, it will be appreciated that as the rotary/adaptor shaft components rotate with respect to the stationary component, fluid flow will vary between a minimum and maximum value, providing a resultant variation in fluid flow and pressure. The shapes of the ports increase the pressure differential between the "choked" state (when fluid is maximally blocked) and the point at which the ports 632, 652 enter into alignment, because they are shaped to provide as much instantaneous fluid flow as possible, and thus a greater pressure variation without requiring increased fluid pressure at the surface, thus potentially reducing wear on components in the drilling string, particularly when combined with the tapered configurations of the stationary and rotary components.

Those skilled in the art will appreciated that the foregoing examples not only provide for selective activation of tools in the drilling string by permitting the operator to selectively activate, and optionally deactivate, the valve section 400 using the ball catch component 100, but also provides a pathway for other tools and components to pass through the entire assembly 10 to downhole locations. The ball catch component 100, motor section 200, drive section 300, and valve section 400 all provide a substantially continuous pathway, which can be adequately sized to permit wireline gear to pass through the entire assembly 10 while it is still downhole. In addition, the pathway can permit the passage of other balls or similar projectiles through the assembly 10 and down to other tools located below the assembly 10, such as other ball catch components, friction reduction tools, PBL subs, lost circulation subs, jars, reamers and the like.

Furthermore, the examples provided above provide for selective activation and deactivation by creating a pathway for the bypass of drilling fluid through the assembly with components that present less of an obstacle to fluid flow in the drilling string as compared to the prior art. As those skilled in the art appreciate, fluid pressure and flow in drilling is critical to successful removal of cuttings from the wellbore, and to successful operation of the drill bit and other pressure-dependent tools in the string. While a number of factors impact the flow rate within a well, such as drilling fluid properties, system and formation pressure limits, the inclusion of different components in the drilling string restricting the effective cross-sectional area of the pathway available for fluid flow can impede the drilling operation by causing pressure drops in the system. Prior art solutions providing for fluid bypass can include several "layers" of cooperating components that effectively reduce the cross-section available for drilling fluid flow. The examples described above, on the other hand, provide a more optimal use of the cross-sectional space in the drilling string. Moreover, the examples above can function satisfactorily without altering the flow rate of drilling fluid into the assembly 10.

Throughout the specification, terms such as "may" and "can" are used interchangeably and use of any particular term should not be construed as limiting the scope or requiring experimentation to implement the claimed subject matter or embodiments described herein. Various embodiments of the present invention or inventions having been thus described in detail by way of example, it will be apparent to those skilled in the art that variations and modifications may be made without departing from the invention(s). The inventions contemplated herein are not intended to be limited to the specific examples set out in this description. For example, where appropriate, specific components may be arranged in a different order than set out in these examples, or even omitted or substituted. As another example, the number, sizes, and profiles of the ports 424, 422 in the rotary valve component 410 and the corresponding recesses 438 in the stationary valve component 430 can be varied as appropriate to accomplish a desired frequency or pulsation effect, or to accommodate particular equipment or drilling fluid. The inventions include all such variations and modifications as fall within the scope of the appended claims.

The invention claimed is:

1. An assembly for use in a tubular string, the assembly comprising:
- a motor comprising a rotor and a stator;
- a rotary component and a stationary component for generating fluid pressure pulses, the rotary component and stationary component each comprising at least one respective port, the rotary component being drivable by the rotor;
- the rotary component, stationary component, and rotor each comprising a bore defining a substantially continuous passage permitting a substantially axial first route for fluid flow through the assembly, the at least one port of the rotary component substantially aligned with the bore of the rotary component and the at least one port of the stationary component substantially aligned with the bore of the stationary component;
- the motor and the ports of the rotary component and stationary component providing a passage permitting a substantially axial second route for fluid flow through the assembly, wherein fluid passing through the assembly along the second route does not flow through the bore of the rotary component or the bore of the stationary component, wherein the passage through the motor is between the rotor and the stator;
- wherein when fluid flows in the assembly through both the first and second routes, the rotary component is driven at a first rotational speed;
- wherein when at least some of the fluid is diverted from the first route to the second route by a blockage disposed in the first route, the rotary component is driven at a second rotational speed.

2. The assembly of claim 1, wherein when at least some of the fluid is diverted from the first route to the second route by the blockage, the fluid flows through both the first and second routes.

3. The assembly of claim 1, wherein rotation of the rotary component with respect to the stationary component produces variations in fluid pressure depending on a rotational speed of the rotary component.

4. The assembly of claim 1, wherein the blockage comprises a blocking implement.

5. The assembly of claim 1, wherein the blocking implement comprises a plug, ball, or dart.

6. The assembly of claim 5, wherein the blocking implement comprises a dart.

7. The assembly of claim 1, wherein each of the rotary component and the stationary component comprise a plurality of respective ports.

8. The assembly of claim 7, wherein the plurality of ports of the rotary component are spaced around the bore of the rotary component, and the plurality of ports of the stationary component are spaced around the bore of the stationary component.

9. A method of operating a downhole assembly, wherein the downhole assembly comprises:

a motor comprising a rotor and a stator;

a rotary component and a stationary component for generating fluid pressure pulses, the rotary component and stationary component each comprising at least one respective port, the rotary component being drivable by the rotor;

the rotary component, stationary component, and rotor each comprising a bore defining a substantially continuous passage permitting a substantially axial first route for fluid flow through the assembly, the at least one port of the rotary component substantially aligned with the bore of the rotary component and the at least one port of the stationary component substantially aligned with the bore of the stationary component;

the motor and the ports of the rotary component and stationary component providing a passage permitting a substantially axial second route for fluid flow through the assembly, wherein fluid passing through the assembly along the second route does not flow through the bore of the rotary component or the bore of the stationary component, wherein the passage through the motor is between the rotor and the stator, the method comprising:

causing fluid to flow into the downhole assembly through the first and second routes to thereby drive the rotary component at a first rotational speed;

diverting at least some fluid flowing through the first route to the second route using a blocking implement to thereby drive the rotary component at a second rotational speed.

10. The method of claim 9, wherein diverting at least some fluid comprises blocking the continuous passage by a blocking implement disposed in the first route.

11. The method of claim 9, wherein fluid flows through both the first route and the second route while the blocking implement is disposed in the first route.

12. The method of claim 9, wherein rotation of the rotary component with respect to the stationary component produces variations in fluid pressure depending on a rotational speed of the rotary component.

13. The method of claim 9, wherein a catch is provided at a first end of the substantially continuous passage for receiving the blocking implement.

14. The method of claim 13, wherein the catch comprises at least one bypass port between the first end and the rotor.

15. The method of claim 9, wherein the blocking implement comprises a plug, ball, or dart.

16. The method of claim 15, wherein the blocking implement comprises a dart.

17. An assembly for use in a downhole string, the assembly comprising:

a motor comprising a rotor and a stator;

a rotary component and a stationary component for generating fluid pressure pulses, the rotary component and stationary component each comprising at least one respective port;

the rotary component, stationary component, and rotor each comprising a bore defining a substantially continuous passage permitting a substantially axial first route for fluid flow through the assembly;

the motor and the ports of the rotary component and stationary component providing a passage permitting a second route for fluid flow through the assembly, wherein fluid passing through the assembly along the second route does not flow through the bore of the rotary component or the bore of the stationary component, wherein the passage through the motor is between the rotor and the stator, the rotary component being drivable by the rotor such that the at least one port of the rotary component enters into and out of alignment with the at least one port of the stationary component to thereby cause pulsing in fluid flowing in the second route in a direction substantially parallel to the axial first route;

wherein when fluid flows in the assembly through both the first and second routes, the rotary component is driven at a first rotational speed;

wherein when at least some of the fluid is diverted from the first route to the second route by a blockage disposed in the first route, the rotary component is driven at a second rotational speed.

* * * * *